US012326990B2

(12) United States Patent
Li et al.

(10) Patent No.: US 12,326,990 B2
(45) Date of Patent: Jun. 10, 2025

(54) METHOD FOR REDUCING DEVICE POWER CONSUMPTION AND ELECTRONIC DEVICE

(71) Applicant: Honor Device Co., Ltd., Shenzhen (CN)

(72) Inventors: Zhe Li, Shenzhen (CN); Yayun Suo, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/267,639

(22) PCT Filed: Dec. 12, 2022

(86) PCT No.: PCT/CN2022/138482
§ 371 (c)(1),
(2) Date: Jun. 15, 2023

(87) PCT Pub. No.: WO2023/169029
PCT Pub. Date: Sep. 14, 2023

(65) Prior Publication Data
US 2024/0419268 A1  Dec. 19, 2024

(30) Foreign Application Priority Data
Mar. 7, 2022  (CN) .......................... 202210214015.2

(51) Int. Cl.
G06F 3/038 (2013.01)
G06F 1/3234 (2019.01)
G06F 3/0354 (2013.01)

(52) U.S. Cl.
CPC ............ *G06F 3/038* (2013.01); *G06F 1/3265* (2013.01); *G06F 3/03545* (2013.01); *G06F 2203/0384* (2013.01)

(58) Field of Classification Search
CPC ...... G06F 1/3265; G06F 3/0383; G06F 21/35; G06F 2203/0384; G06F 1/1698;
(Continued)

(56) References Cited

U.S. PATENT DOCUMENTS

2006/0140166 A1   6/2006   Albulet
2016/0381633 A1   12/2016  Chen
(Continued)

FOREIGN PATENT DOCUMENTS

CN   104601203 A   5/2015
CN   106255047 A   12/2016
(Continued)

*Primary Examiner* — Temesghen Ghebretinsae
*Assistant Examiner* — Ivelisse Martinez Quiles
(74) *Attorney, Agent, or Firm* — Leydig, Voit & Mayer, Ltd.

(57) ABSTRACT

Disclosed are a method for reducing device power consumption and an electronic device. A master device establishes a wireless connection to a slave device, and then determines whether the slave device is a human interface device. If the slave device is the human interface device, the master device determines whether a preferred connection parameter of the slave device is obtained, where the preferred connection parameter includes a slave latency, and the slave latency includes a quantity of connection events the slave device skips before responding to a data packet sent by the master device when the slave device has no data to send to the master device. If the preferred connection parameter is obtained, the master device determines whether the slave latency is 0 or is less than a first threshold, and, if so, the master device initiates parameter update to the slave device.

12 Claims, 18 Drawing Sheets

(58) Field of Classification Search
CPC .... G06F 1/3215; G06F 3/038; G06F 3/03545; G06F 3/04162; G06F 3/0441; G06F 3/0442; G06F 1/325; G06F 1/3259; G06F 1/3271; Y02D 30/00; Y02D 30/50; Y02D 30/70; H04W 52/00; H04W 52/0219; H04W 52/0261; H04W 76/28; H04W 84/20; H04W 52/0251; H04W 52/0254; H04W 76/14; G08C 2201/12
See application file for complete search history.

(56) References Cited

U.S. PATENT DOCUMENTS

| | | | |
|---|---|---|---|
| 2020/0052520 A1* | 2/2020 | Kang | ............... G06F 1/266 |
| 2021/0044680 A1 | 2/2021 | Kang et al. | |
| 2021/0204212 A1 | 7/2021 | Kumar et al. | |

FOREIGN PATENT DOCUMENTS

| | | | |
|---|---|---|---|
| CN | 107231605 A | 10/2017 | |
| CN | 111491284 A | 8/2020 | |
| CN | 112202957 A | 1/2021 | |
| CN | 112367647 A | 2/2021 | |
| CN | 114095907 A | 2/2022 | |
| CN | 114286433 A | 4/2022 | |

\* cited by examiner

METHOD FOR REDUCING DEVICE POWER CONSUMPTION AND ELECTRONIC DEVICE

CROSS-REFERENCE TO RELATED APPLICATIONS

This application is a national stage of International Application No. PCT/CN2022/138482, filed on Dec. 12, 2022, which claims priority to Chinese Patent Application No. 202210214015.2, filed on Mar. 7, 2022, both of which are hereby incorporated by reference in their entireties.

TECHNICAL FIELD

Embodiments of this application relate to the field of terminal technologies, and in particular, to a method for reducing device power consumption and an electronic device.

BACKGROUND

A human interface device (HID), also referred to as a human input device, is a type of computer device that directly interacts with humans. The HID usually provides an input method available to humans and may transmit output information to humans. Common HIDs include a stylus, a mouse, a keyboard, and the like. An electronic device like a mobile phone or a portable android device can establish a wireless or wired connection, for example, a Bluetooth low energy (BLE) connection, to an HID, and is used in conjunction with the HID. In a terminal system that includes an electronic device like a mobile phone or a portable android device, and an HID like a stylus, a mouse, or a keyboard, the mobile phone or the portable android device may be referred to as a master device (master), and the HID may be referred to as a slave device (slave).

After establishing a connection to the slave device, the master device may perform data communication based on a preferred connection parameter of the slave device. Currently, preferred connection parameters of some slave devices are unreasonably set. Therefore, the slave device still frequently responds to a data packet of the master device, even when the master sends small bits of data and has no requirement for high real-time performance. As a result, power consumption is increased.

SUMMARY

Embodiments of this application provide a method for reducing device power consumption and an electronic device, to reduce power consumption of a master device and/or a slave device, thereby improving use experience of a user.

According to a first aspect, an embodiment of this application provides a method for reducing device power consumption, including: A first electronic device which is used as a master device establishes a wireless connection to a second electronic device which is used as a slave device, and then determines whether the second electronic device is a human interface device. If the second electronic device is the human interface device, the first electronic device determines whether a preferred connection parameter of the second electronic device is obtained, where the preferred connection parameter includes a slave latency, and the slave latency includes a quantity of connection events the slave device skips before responding to a data packet sent by the master device when the slave device has no data to send to the master device. If the preferred connection parameter is obtained, the first electronic device determines whether the slave latency is 0 or is less than a first threshold. If the slave latency is 0 or is less than the first threshold, the first electronic device initiates parameter update to the second electronic device, to increase the slave latency.

According to the foregoing method, when the master device is not required to send data to the slave device, the slave device may decrease frequency of responding to the data packet of the master device, to reduce power consumption of the slave device.

In an implementation, after the first electronic device determines whether a preferred connection parameter of the second electronic device is obtained, the method further includes: If the preferred connection parameter is not obtained, the first electronic device waits for the second electronic device to adjust a connection parameter. After the second electronic device adjusts the connection parameter, the first electronic device waits for first duration, and then determines whether the slave latency in a current connection parameter is 0 or is less than the first threshold. If the slave latency is 0 or is less than the first threshold, the first electronic device initiates parameter update to the second electronic device, to increase the slave latency. In this way, when the master device is not required to send the data to the slave device, the slave device may decrease the frequency of responding to the data packet of the master device, to reduce the power consumption of the slave device.

In an implementation, after the first electronic device initiates parameter update to the second electronic device, the method further includes: The first electronic device determines whether the parameter update succeeds. If the parameter update succeeds, the first electronic device supervises, within second duration that starts from a time at which the parameter update succeeds, whether the second electronic device re-initiates parameter update or whether disconnection occurs. If the second electronic device re-initiates the parameter update or the disconnection occurs, the first electronic device does not actively adjust the connection parameter. In this way, that the slave device re-initiates the parameter update, or the disconnection occurs indicates that the slave device may have some compatibility issues with the new connection parameter. Therefore, the master device does not actively adjust the connection parameter of the slave device, and connection stability is improved.

In an implementation, the method further includes: The first electronic device establishes the wireless connection to the second electronic device, and then determines whether frequency at which the first electronic device sends data to the second electronic device is greater than a second threshold. If the frequency at which the first electronic device sends the data to the second electronic device is greater than a second threshold, the first electronic device initiates parameter update to the second electronic device, to adjust the slave latency to 0. In this way, when the data sent by the master device to the slave device increases, the master device actively initiates the parameter update to the slave device to adjust the slave latency of the slave device to 0, so that the slave device responds to a data packet sent by the master device in each connection event. This increases a data transmission speed.

In an implementation, after the first electronic device initiates parameter update to the second electronic device, the method further includes: The first electronic device supervises, within third duration that starts from a time at which the parameter update succeeds, whether the second electronic device re-initiates parameter update or whether disconnection occurs. If the second electronic device re-initiates the parameter update or the disconnection occurs, the first electronic device does not actively adjust a connection parameter in a scenario in which the frequency at which the first electronic device sends the data to the second electronic device is greater than the second threshold. In this way, that the slave device re-initiates the parameter update, or the disconnection occurs indicates that the slave device may have some compatibility issues with the new connection parameter. Therefore, in the scenario in which the frequency at which the master device sends the data to the slave device is greater than the second threshold, the master device does not actively adjust the connection parameter of the slave device, and connection stability is improved.

In an implementation, after the first electronic device supervises whether the second electronic device re-initiates parameter update or whether disconnection occurs, the method further includes: If the second electronic device does not re-initiate the parameter update or the disconnection does not occur, the first electronic device determines whether the frequency at which the first electronic device sends the data to the second electronic device is less than the second threshold. If the frequency at which the first electronic device sends the data to the second electronic device is less than the second threshold, the first electronic device initiates parameter update to the second electronic device, to increase a connection interval between the first electronic device and the second electronic device, where the connection interval includes an interaction interval between the master device and the slave device. In this way, when the data sent by the master device to the slave device decreases, the master device actively initiates the parameter update to the slave device to increase the slave latency, thereby reducing the power consumption of the slave device.

In an implementation, the method further includes: The first electronic device initiates, when a display is turned off, parameter update to the second electronic device, to increase a connection interval between the first electronic device and the second electronic device, where the connection interval includes an interaction interval between the master device and the slave device. The first electronic device supervises, within fourth duration that starts from a time at which the parameter update succeeds, whether the second electronic device re-initiates parameter update or whether disconnection occurs. If the second electronic device re-initiates the parameter update or the disconnection occurs, the first electronic device does not actively adjust a connection parameter in a scenario in which the display is turned off. In this way, when the display is turned off, the master device actively initiates the parameter update to the slave device to increase the connection interval between the master device and the slave device, to reduce frequency of connection events, thereby reducing the power consumption of the master device and the slave device.

In an implementation, the method further includes: The first electronic device determines, when the display is turned on, whether the connection interval between the first electronic device and the second electronic device is adjusted during a period in which the display is turned off. If the first electronic device adjusts the connection interval between the first electronic device and the second electronic device, the first electronic device initiates parameter update to the second electronic device, to decrease the connection interval between the first electronic device and the second electronic device. In this way, when the display is turned on, the master device actively initiates the parameter update to the slave device to decrease the connection interval between the master device and the slave device, to increase the frequency of connection events. Therefore, when the master device sends a data packet to the slave device, the slave device can respond to the data packet in a timely manner.

In an implementation, that the first electronic device initiates parameter update to the second electronic device, to increase the slave latency includes: The first electronic device initiates the parameter update to the second electronic device, and adjusts the slave latency to a preset target value, where the preset target value is a positive integer greater than 0.

In an implementation, that the first electronic device initiates parameter update to the second electronic device, to increase a connection interval between the first electronic device and the second electronic device includes: The first electronic device initiates the parameter update to the second electronic device, to increase the connection interval between first electronic device and the second electronic device by one or more times.

In an implementation, that the first electronic device initiates parameter update to the second electronic device, to decrease the connection interval between the first electronic device and the second electronic device includes: The first electronic device initiates the parameter update to the second electronic device, to decrease the connection interval between the first electronic device and the second electronic device by one or more times.

According to a second aspect, an embodiment of this application provides a method for reducing device power consumption, including: When a second electronic device which is used as a slave device enters a sleep state, the second electronic device initiates parameter update to a first electronic device which is used as a master device, to increase a connection interval between the second electronic device and the first electronic device, where the connection interval includes an interaction interval between the master device and the slave device. The second electronic device initiates, when the second electronic device is woken up from the sleep state, parameter update to the first electronic device, to decrease the connection interval between the second electronic device and the first electronic device.

According to the foregoing method, when entering the sleep state, the slave device actively increases the connection interval between the slave device and the master device, to reduce power consumption. When being woken up from the sleep state, the slave device actively decreases the connection interval between the slave device and the master device, to improve real-time performance of data transmission.

According to a third aspect, an embodiment of this application provides an electronic device, including a memory, and one or more processors. The memory is coupled to the one or more processors, the memory is configured to store computer program code, the computer program code includes computer instructions, and the one or more processors are configured to invoke the computer instructions, so that an input device performs the method executed by the first electronic device or the second electronic device in the foregoing aspects and the implementations of the foregoing aspects.

According to a fourth aspect, an embodiment of this application further provides a chip system. The chip system includes a processor and a memory. The memory stores program instructions. When the program instructions are executed by the processor, the chip system is enabled to perform the methods in the foregoing aspects and the implementations of the foregoing aspects, for example, generate or process information in the method.

According to a fifth aspect, an embodiment of this application provides a computer-readable storage medium. The computer-readable storage medium stores program instructions. When the program instructions run on a computer, the computer is enabled to perform the methods in the foregoing aspects and the implementations of the foregoing aspects.

According to a sixth aspect, an embodiment of this application further provides a computer program product. When the computer program product runs on a computer, the computer is enabled to perform the methods in the foregoing aspects and the implementations of the foregoing aspects.

DESCRIPTION OF EMBODIMENTS

Figure 1:
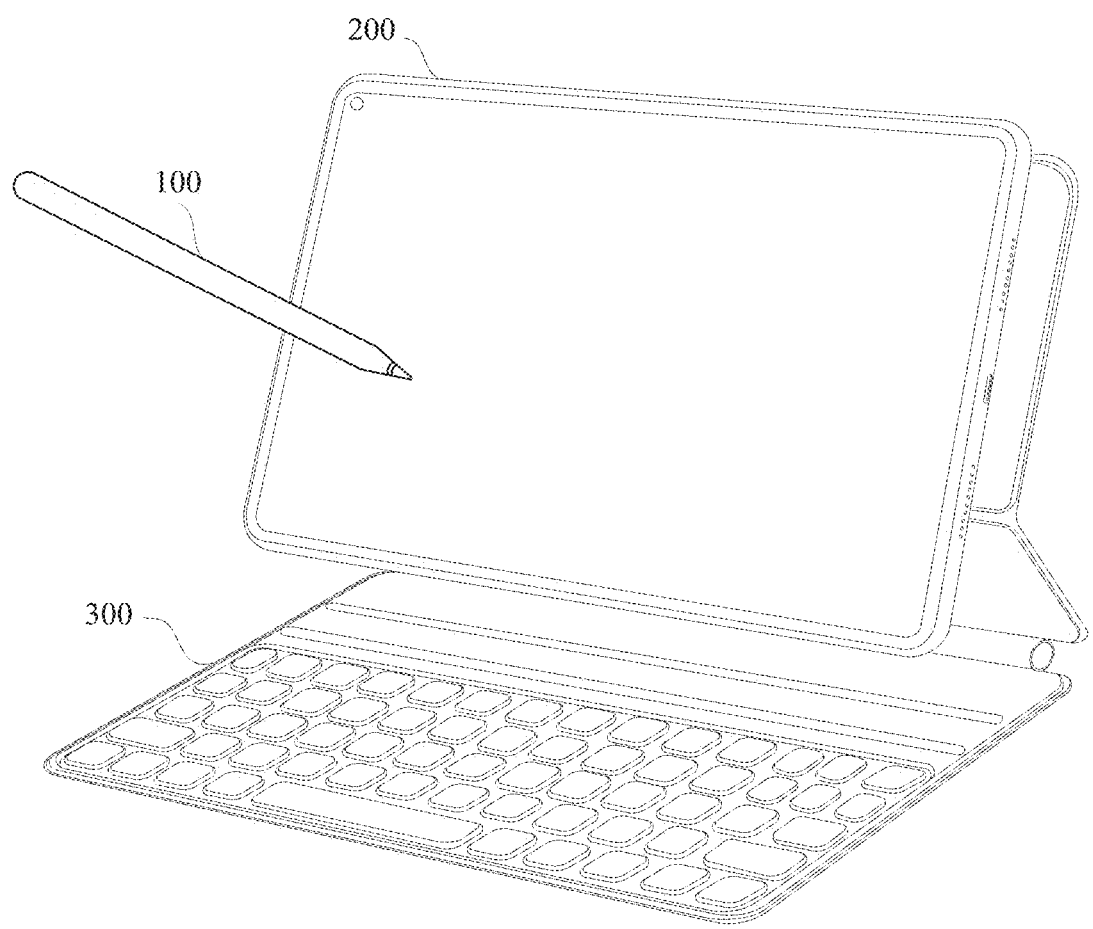
FIG. 1 is a schematic diagram of a scenario to which an embodiment of this application is applicable.

The following clearly describes the technical solutions in embodiments of this application with reference to the accompanying drawings in the embodiments of this application. Apparently, the described embodiments are merely some rather than all of embodiments of this application. All other embodiments obtained by a person of ordinary skill in the art based on the embodiments of this application without creative efforts shall fall within the protection scope of this application.

In this application, the character "/" generally indicates an "or" relationship between the associated objects. For example, A/B can be understood as A or B.

The terms "first" and "second" are used merely for the purpose of description, and shall not be construed as indicating or implying relative importance or implying a quantity of indicated technical features. Therefore, a feature limited by "first" or "second" may explicitly or implicitly include one or more of the features. In the descriptions of the embodiments, unless otherwise specified, "a plurality of" means two or more.

In addition, the terms "include" and "have" mentioned in the description of this application and any other variant thereof are intended to cover non-exclusive inclusion. For example, a process, method, system, product, or device that includes a series of steps or modules is not limited to the listed steps or modules, but further optionally includes a step or module that is not listed, or further optionally includes another step or module that is intrinsic to the process, method, product, or device.

In addition, in the embodiments of this application, words such as "exemplary" or "example" are used to indicate instances, illustrations, or descriptions. Any embodiment or design scheme described as "exemplary" or "example" in this application should not be construed as being more preferred or advantageous than other embodiments or design schemes. Exactly, use of the terms, such as "exemplary" or "for example", is intended to present a concept in a specific manner.

A human interface device (HID), also referred to as a human input device, is a type of computer device that directly interacts with humans. The HID usually provides an input method available to humans and may transmit output information to humans. Common HIDs include a stylus, a mouse, a keyboard, and the like. An electronic device like a mobile phone or a portable android device can establish a wireless or wired connection, for example, a Bluetooth low energy (BLE) connection, to an HID, and is used in conjunction with the HID. In a terminal system that includes an electronic device like a mobile phone or a portable android device, and an HID like a stylus, a mouse, or a keyboard, the electronic device may be referred to as a master device (master), and the HID may be referred to as a slave device (slave).

After establishing a connection to the slave device, the master device may perform data communication based on a preferred connection parameter of the slave device. For example, after the master device establishes a BLE connection to the slave device, the master device may read the preferred connection parameter(s) of the slave device, and performs data communication with the slave device based on the preferred connection parameter(s). In the BLE connection, the data communication between the master device and the slave device may be performed in a connection event.

Generally, the preferred connection parameter may include the following three attributes: a connection interval, a connection latency (for example, a slave latency), and supervision timeout. The connection interval refers to an interaction interval between the master device and the slave device, that is, a time interval from the start of a connection event to the start of a next connection event, generally in a unit of milliseconds. The slave latency refers to a quantity of connection events the slave device skips before responding to a data packet sent by the master device when the slave device has no data to send. The supervision timeout refers to a specified timeout time. If the master device and the slave device do not communicate within this timeout time, the BLE connection is automatically disconnected.

Generally, when the slave device is the HID, in a process in which the master device is used in conjunction with the slave device, data is mainly sent from the slave device to the master device, and a requirement for relatively high real-time performance is required for sending data from the slave device to the master device. Otherwise, a user may perceive stuck. For example, when the user uses the stylus to perform a writing operation on the master device, the stylus transmits a pressure sensing message to the master device in real time, so that the master device generates a line with a corresponding thickness based on the pressure sensing message of the stylus and a trajectory of the stylus. If the stylus cannot send the pressure sensing message to the master device in real time, the line generated by the master device cannot change with a change in force that is put down on the stylus when the user writes with the stylus. For another example, when the user uses the mouse, if the mouse cannot send displacement information of the mouse to the master device in real time, cursor movements of the master device will freeze. A difference is that the master device sends relatively small bits of data to the slave device in most scenarios, and there is no requirement for high real-time performance. The master device is required to send large bits of data to the slave device only in a small quantity of scenarios. For example, when the stylus performs firmware upgrade, the stylus needs to obtain a firmware package required for the upgrade from the master device. In this case, the master device sends large bits of data to the stylus.

Generally, the master device may send a data packet to the slave device in each connection event. If the master device has no data to send to the slave device, the master device may send an empty data packet. After the slave device receives the data packet (including the empty data packet) sent by the master device, the slave device may respond to or may not respond to the data packet based on a connection parameter (for example, the slave latency). After the master device receives a response from the slave device, the master device may consider that the data packet is sent successfully. If the master device does not receive a response from the slave device, the master device may consider that the data packet fails to be sent.

Currently, preferred connection parameters of some slave devices are unreasonably set. Therefore, the slave device still frequently responds to the data packet (including the empty data packet) of the master device, even when the master sends small bits of data and has no requirement for high real-time performance. As a result, power consumption is increased.

Therefore, an embodiment of this application provides a method for reducing device power consumption. The method may be applied to a terminal system that includes the master device and the slave device, to reduce the power consumption of the master device and/or the slave device, thereby improving use experience of the user.

To facilitate understanding of the technical solutions of this application, before a method for reducing the device power consumption in the embodiments of this application is described in detail, the conventional technique is first introduced.

FIG. 1 is a schematic diagram of a scenario to which an embodiment of this application is applicable. With reference to FIG. 1, the scenario includes a master device and at least one slave device. The master device may be a mobile terminal or a stationary terminal having a touch control screen, such as a mobile phone, a portable tablet device (tablet), portable Android device (PAD), a personal digital assistant (PDA), a handheld device having a wireless communication function, a computing device, an on-board device or a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, or a wireless terminal in a smart home. A form of the master device is not specifically limited in this embodiment of this application. The slave device may be, for example, a human interface device (HID), and any device that can implement wireless or wired connection to the master device. The wireless connection includes but is not limited to a Bluetooth connection (for example, a Bluetooth low energy (BLE) connection), a Wi-Fi connection, a Wi-Fi peer-to-peer (P2P) connection, a zigbee connection, a near field communication (NFC) connection, and the like. Taking the slave device that can implement Bluetooth connection to the master device as an example, the slave device may be a Bluetooth stylus, a Bluetooth keyboard, a Bluetooth headset, a Bluetooth mouse, a Bluetooth loudspeaker box, a Bluetooth bracelet, or the like. Provided that software adapts, the slave device falls within the protection scope of this application. FIG. 1 illustrates an example where a portable android device 200 is used as the master device and a Bluetooth stylus 100 or a Bluetooth keyboard 300 is used as the slave device. This is not limited in actual application.

Figure 2:
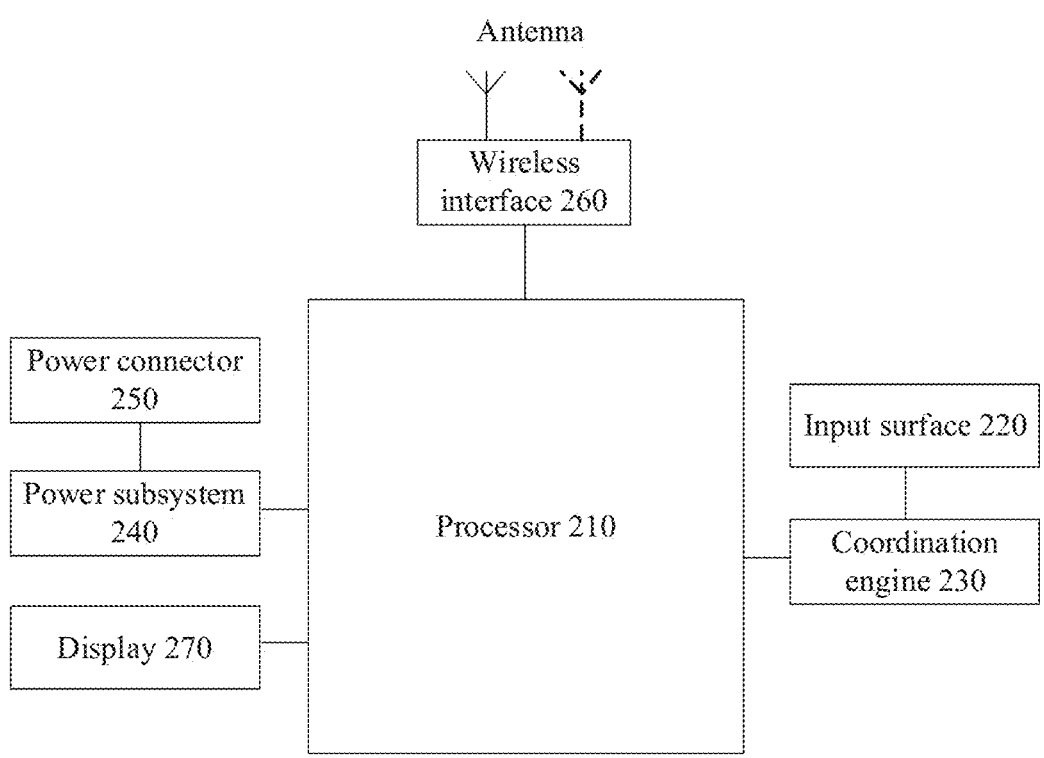
FIG. 2 is a schematic diagram of a structure of an electronic device according to an embodiment of this application.

FIG. 2 is a schematic diagram of a structure of an electronic device according to an embodiment of this application. The electronic device may be used as the master device in FIG. 1. With reference to FIG. 2, the electronic device may include a plurality of subsystems. The subsystems cooperate to execute, coordinate, or supervise one or more operations or functions of the electronic device. The electronic device includes a processor 210, an input surface 220, a coordination engine 230, a power subsystem 240, a power connector 250, a wireless interface 260, and a display 270.

For example, the coordination engine 230 may be configured to: communicate with another subsystem of the electronic device and/or process data; communicate with and/or transact data with an external device; measure and/or obtain output of one or more analog or digital sensors (for example, a touch sensor); measure and/or obtain output of one or more sensor nodes in a sensor node array (for example, a capacitive sensing node array); receive and position a tip signal and a ring signal from the external device; and position a Bluetooth stylus based on locations of a tip signal crossing area and a ring signal crossing area, and the like.

The coordination engine 230 of the electronic device includes or is otherwise communicatively coupled to a sensor layer below or integrated with the input surface 220. The coordination engine 230 is configured to position the Bluetooth stylus on the input surface 220 by using the sensor layer and estimate an angular position of the Bluetooth stylus relative to a plane of the input surface 220 by using the technology described herein. In an embodiment, the input surface 220 may be referred to as a touch screen. In many cases, the coordination engine 230 may be configured to detect, via capacitive coupling, the tip signal and the ring signal received from the external device through the sensor layer.

The tip signal and/or the ring signal may include specific information and/or data that may be configured to enable the electronic device to identify the external device. Such information is generally referred to herein as "stylus identity" information. The information and/or data may be received by the sensor layer and interpreted, decoded, and/or demodulated by the coordination engine 230.

The processor 210 may use the stylus identity information to simultaneously receive input from more than one external device. Specifically, the coordination engine 230 may be configured to transmit, to the processor 210, a position and/or an angular position of each of a plurality of external devices detected by the coordination engine 230. In other cases, the coordination engine 230 may further transmit, to the processor 210, information about relative positions and/or relative angular positions of the plurality of external devices detected by the coordination engine 230. For example, the coordination engine 230 may notify the processor 210 of a position of a detected first Bluetooth stylus relative to a detected second Bluetooth stylus.

In another case, the tip signal and/or the ring signal may further include specific information and/or data used to enable the electronic device to identify a specific user. Such information is generally referred to herein as "user identity" information.

The coordination engine 230 may forward the user identity information (if the user identity information can be detected and/or can be restored) to the processor 210. If the user identity information cannot be recovered from the tip signal and/or the ring signal, the coordination engine 230 may optionally indicate to the processor 210 that the user identity information is not available. The processor 210 can utilize the user identity information (or absence of such information) in any suitable manner, including but not limited to: accepting or denying input from the specific user, allowing or denying access to a specific function of the electronic device, and the like. The processor 210 may use the user identity information to simultaneously receive input from more than one user.

In another case, the tip signal and/or the ring signal may include specific information and/or data that may be configured to enable the electronic device to identify settings or preferred usage of the user or the external device. Such information is generally referred to herein as "stylus setting" information.

The coordination engine 230 may forward the stylus setting information (if the stylus setting information can be detected and/or can be restored) to the processor 210. If the stylus setting information cannot be recovered from the tip signal and/or the ring signal, the coordination engine 230 may optionally indicate to the processor 210 that the stylus setting information is not available. The electronic device can utilize the stylus setting information (or absence of such information) in any suitable manner, including but not limited to: applying a setting to the electronic device, applying a setting to a program running on the electronic device, changing a line thickness, a color, and a pattern presented by a graphics program of the electronic device, changing a setting of a video game operated on the electronic device, and the like.

Usually, the processor 210 may be configured to: perform, coordinate, and/or manage functions of the electronic device. Such functions may include, but are not limited to, communicating with and/or exchanging data with other subsystems of the electronic device; communicating with and/or exchanging data with the external device; performing data communication and/or data exchange through a wireless interface; performing data communication and/or data exchange through a wired interface; facilitating exchange of power through a wireless (for example, inductive, resonant, or the like) or wired interface; and receiving position(s) and angular position(s) of one or more Bluetooth styluses, or the like.

During use, the processor 210 may be configured to access a memory that stores instructions. The instructions may be configured to enable the processor to perform, coordinate, or supervise one or more operations or functions of the electronic device.

The instructions stored in the memory may be configured to control or coordinate operations of other components of the electronic device. The components are, for example but not limited to, another processor, an analog or digital circuit, a volatile or nonvolatile memory module, a display, a speaker, a microphone, a rotary input device, a button or other physical input devices, a biometric authentication sensor and/or system, a force or touch input/output component, a communication module (for example, a wireless interface and/or a power connector), and/or a haptic device or a haptic feedback device.

The memory may further store electronic data usable by the external device or the processor. For example, the memory may store electronic data or contents (such as media files, documents, and applications), device settings and preferred usage, timing signals and control signals, or data, data structures, or databases for various modules, files or configurations related to detection of tip signals and/or ring signals, or the like. The memory may be configured as any type of memory. For example, the memory may be implemented as a random access memory, a read-only memory, a flash memory, a removable memory, other types of storage elements, or a combination of such devices.

The electronic device further includes the wireless interface 260 to facilitate electronic communication between the electronic device and/or C. In an implementation solution, the electronic device may be configured to communicate with the corresponding external device through a low-energy Bluetooth communication interface or a near field communication interface. In other examples, the communication interface facilitates electronic communication between the electronic device and an external communication network, a device, or a platform.

The wireless interface 260 (regardless of a communication interface between the electronic device and the external device or another communication interface) may be implemented as one or more wireless interfaces, Bluetooth interfaces, near field communication interfaces, magnetic interfaces, universal serial bus interfaces, inductive interfaces, resonant interfaces, capacitive coupling interfaces, Wi-Fi interfaces, TCP/IP interfaces, network communication interfaces, optical interfaces, acoustic interfaces, or any conventional communication interface.

The electronic device further includes the display 270. The display 270 may be located behind the input surface 220, or may be integrated with the input surface 220. The display 270 may be communicatively coupled to the processor 210. The processor 210 may present information to a user through the display 270. In many cases, the processor 210 uses the display 270 to present an interface with which the user can interact. In many cases, the user manipulates the external device to interact with the interface.

Figure 3:
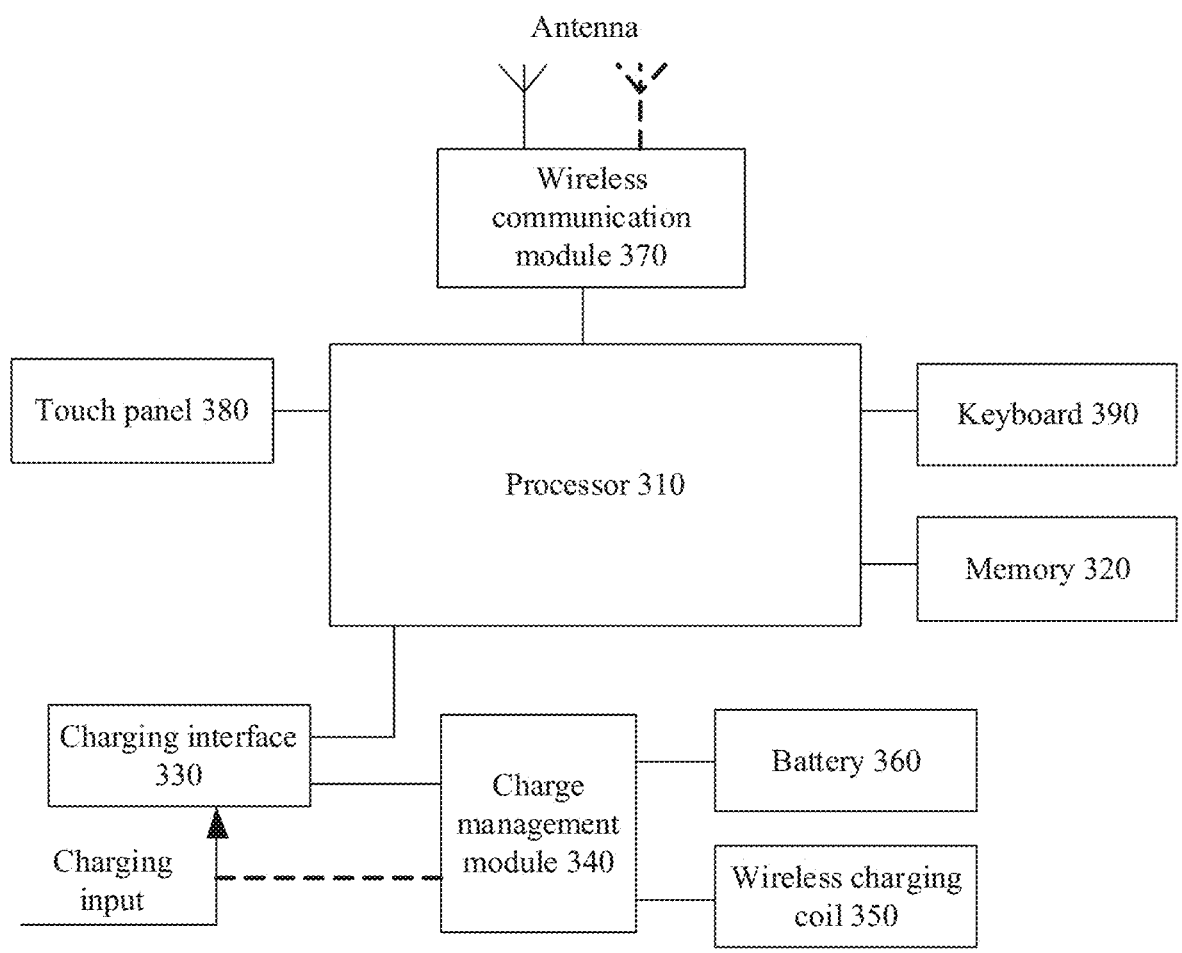
FIG. 3 is a schematic diagram of a structure of a Bluetooth keyboard according to an embodiment of this application.

FIG. 3 is a schematic diagram of a structure of a Bluetooth keyboard 300 according to an embodiment of this application. The Bluetooth keyboard may be used as the slave device in FIG. 1. With reference to FIG. 3, the Bluetooth keyboard 300 may include a processor 310, a memory 320, a charging interface 330, a charging management module 340, a wireless charging coil 350, a battery 360, a wireless communication module 370, a touch panel 380, and a keyboard 390.

The processor 310, the memory 320, the charging interface 330, the charging management module 340, the battery 360, the wireless communication module 370, the touch panel 380, the key board 390, and the like may all be disposed on a keyboard body (that is, 302 shown in FIG. 4A) of the Bluetooth keyboard 300. The wireless charging coil 350 may be disposed in a connecting portion (that is, 304 shown in FIG. 4A) for movably connecting the key board body to holders.

The memory 320 may be configured to store program code, for example, program code used to wirelessly charge the Bluetooth stylus 100. The memory 320 may further store a Bluetooth address for uniquely identifying the Bluetooth keyboard 300. In addition, the memory 320 may further store connection data of an electronic device that has been successfully paired with the Bluetooth keyboard 300. For example, the connection data may be a Bluetooth address of the electronic device that has been successfully paired with the Bluetooth keyboard 300. Based on the connection data, the Bluetooth keyboard 300 can be automatically paired with the electronic device without configuring a connection between the Bluetooth keyboard 300 and the electronic device, for example, performing validity verification. The Bluetooth address may be a media access control (MAC) address.

The processor 310 may be configured to: execute the application code, and invoke a related module to implement a function of the Bluetooth keyboard 300 in this embodiment of this application, for example, to implement a wired charging function, a reverse wireless charging function, a wireless communication function, or the like of the Bluetooth keyboard 300. The processor 310 may include one or more processing units, and different processing units may be separate devices or may be integrated into one or more processors 310. The processor 310 may be specifically an integrated control chip, or may include a circuit including various active and/or passive components, and the circuit is configured to perform functions of the processor 310 described in this embodiment of this application. The processor of the Bluetooth keyboard 300 may be a microprocessor.

The wireless communication module 370 may be configured to support data exchange between the Bluetooth keyboard 300 and another electronic device over wireless communication including Bluetooth (BT), a global navigation satellite system (GNSS), a wireless local area network (WLAN) (for example, a wireless fidelity (Wi-Fi) network), frequency modulation (FM), near field communication (NFC), an infrared (IR) technology, and the like.

In some embodiments, the wireless communication module 370 may be a Bluetooth module, and may be specifically a Bluetooth chip. The Bluetooth keyboard 300 may, through the Bluetooth chip, be paired with a Bluetooth chip of another electronic device and establish a wireless connection, to implement wireless communication between the Bluetooth keyboard 300 and the another electronic device through the wireless connection.

In addition, the wireless communication module 370 may further include an antenna. The wireless communication module 370 receives an electromagnetic wave through the antenna, performs frequency modulation and filtering on an electromagnetic wave signal, and sends a processed signal to the processor 310. The wireless communication module 370 may further receive a to-be-sent signal from the processor 310, perform frequency modulation and amplification on the signal, and convert the signal into an electromagnetic wave for radiation through the antenna.

A touch sensor is integrated into the touch panel 380. A notebook computer may receive a control command of a user on the notebook computer through the touch panel 380 and the key board 390.

Figure 4A:
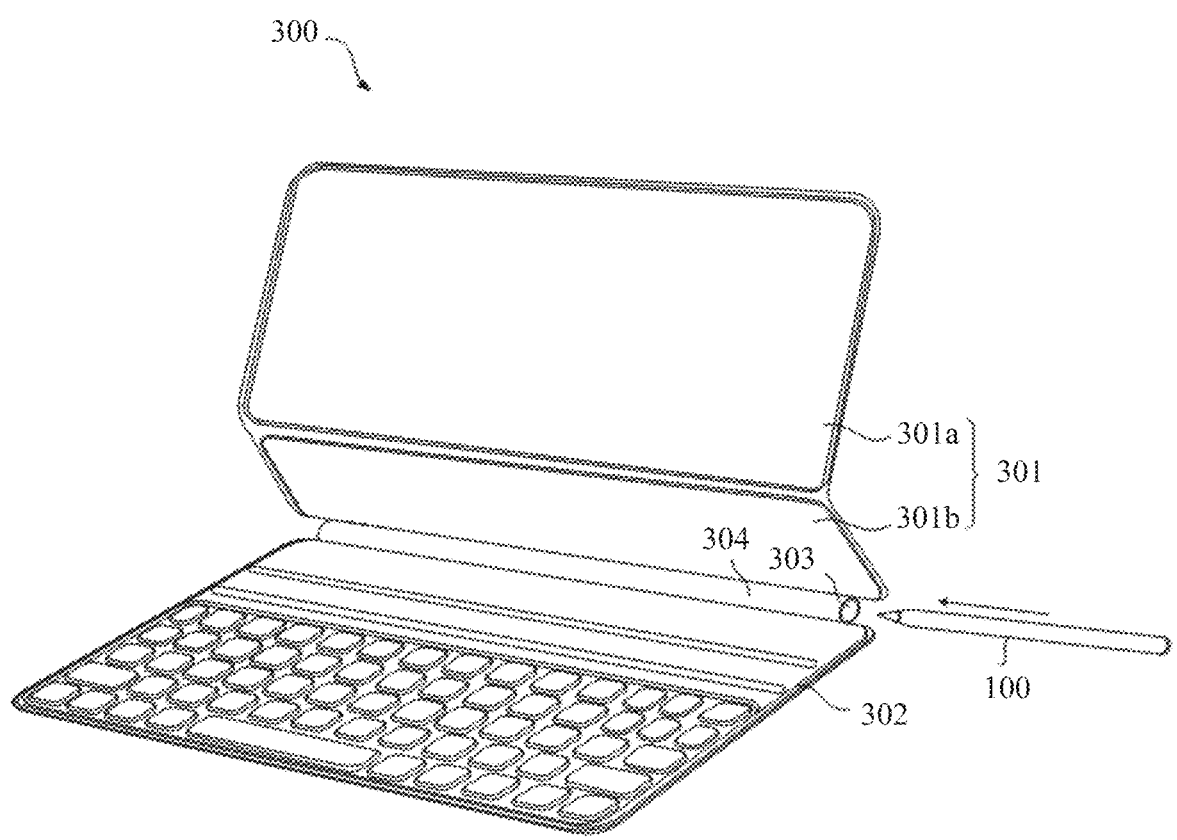
FIG. 4A, FIG. 4B, and FIG. 4C are schematic diagrams of different use statuses of a terminal system according to an embodiment of this application.

In an embodiment, as shown in FIG. 4A, the Bluetooth keyboard 300 may include a first portion 301 and a second portion 302. For example, the Bluetooth keyboard 300 may include a keyboard body and a keyboard cover. The first portion 301 may be the keyboard cover, and the second portion 302 is the key board body. The first portion 301 is configured to accommodate the electronic device, and the second portion 302 may be provided with keys, a touch panel, or the like for a user operation.

The first portion 301 may include at least two holders that are rotatably connected to each other, for example, a first holder 301a and a second holder 301b. The first holder 301a and the second holder 301b are rotatably connected to each other.

As shown in FIG. 4A, to accommodate the Bluetooth stylus 100, the Bluetooth keyboard 300 may be provided with an accommodating portion 303 for accommodating the Bluetooth stylus 100. As shown in FIG. 4A, the accommodating portion 303 is a cylindrical cavity. When being accommodated, the Bluetooth stylus 100 is inserted into the accommodating cavity along an arrow shown in FIG. 4A. In this embodiment, as shown in FIG. 4A, the second portion 302 and the second holder 301b are rotatably connected to each other through the connecting portion 304, and the accommodating portion 303 is disposed in the connecting portion 304. The connecting portion 304 may be a rotating shaft.

Figure 4B:
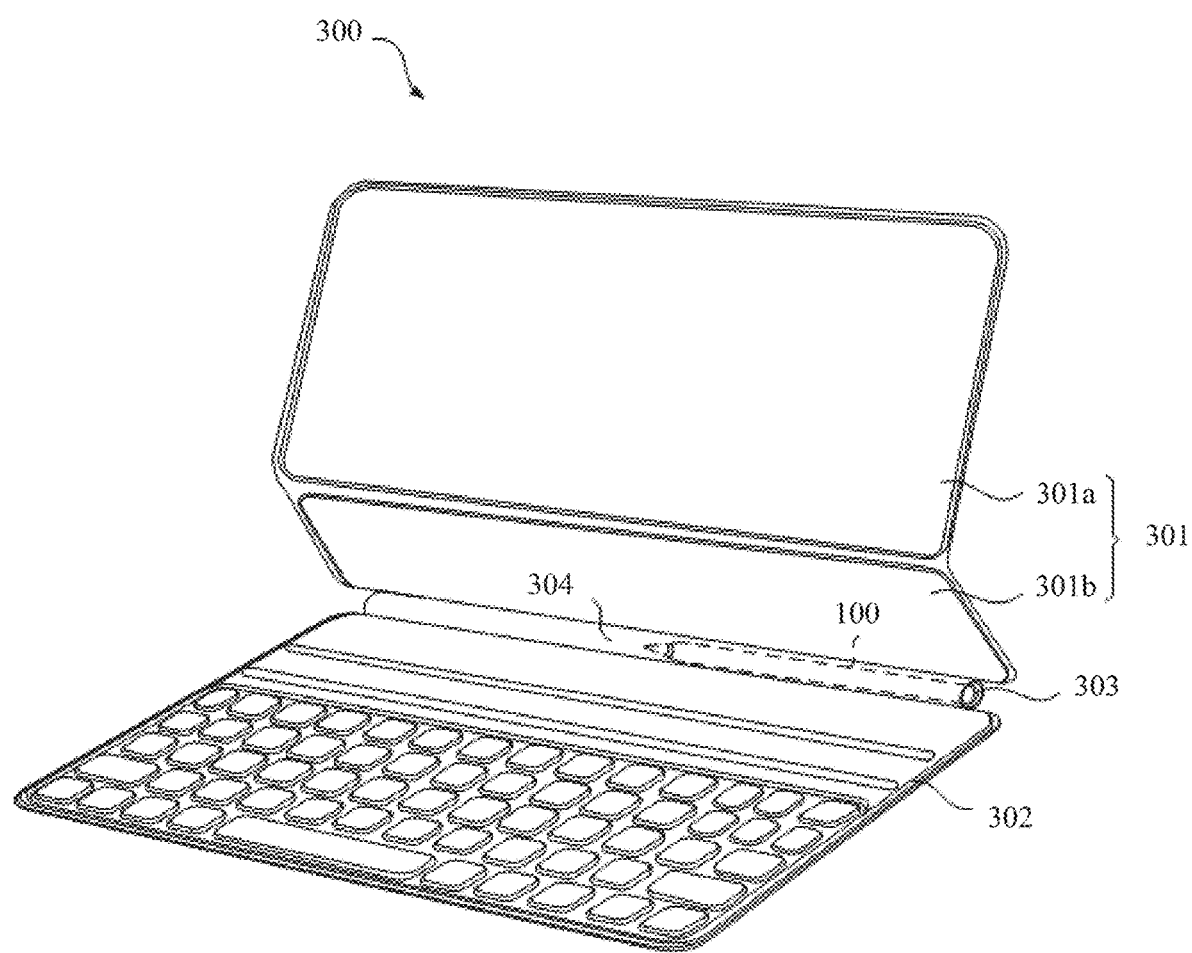
Figure 4C:
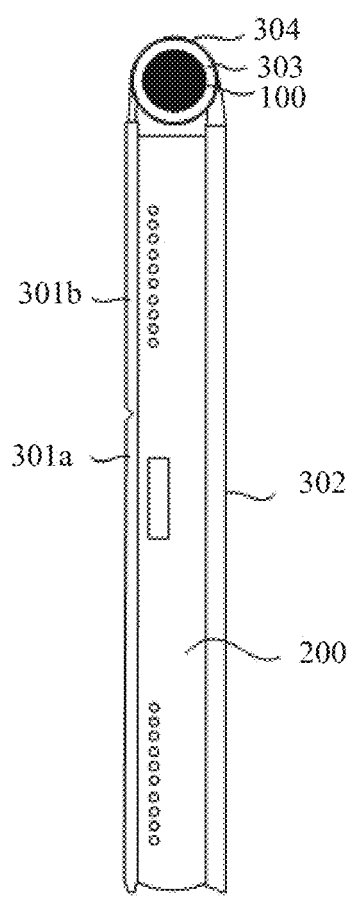

FIG. 4B is a schematic diagram in which a Bluetooth stylus 100 is accommodated in the accommodating portion 303. FIG. 4C is a schematic diagram of a side view obtained when the Bluetooth stylus 100 is accommodated in the accommodating portion 303 of the Bluetooth keyboard 300. With reference to FIG. 4C, the accommodating portion 303 is a circular cavity, and an inner diameter of the accommodating portion 303 is larger than an outer diameter of the Bluetooth stylus 100.

To prevent the Bluetooth stylus 100 from falling when the Bluetooth stylus 100 is placed in the accommodating portion 303, in some examples, the Bluetooth stylus 100 and the accommodating portion 303 are fastened in a manner, including but not limited to magnetic adsorption or snap-fitting.

Figure 5:
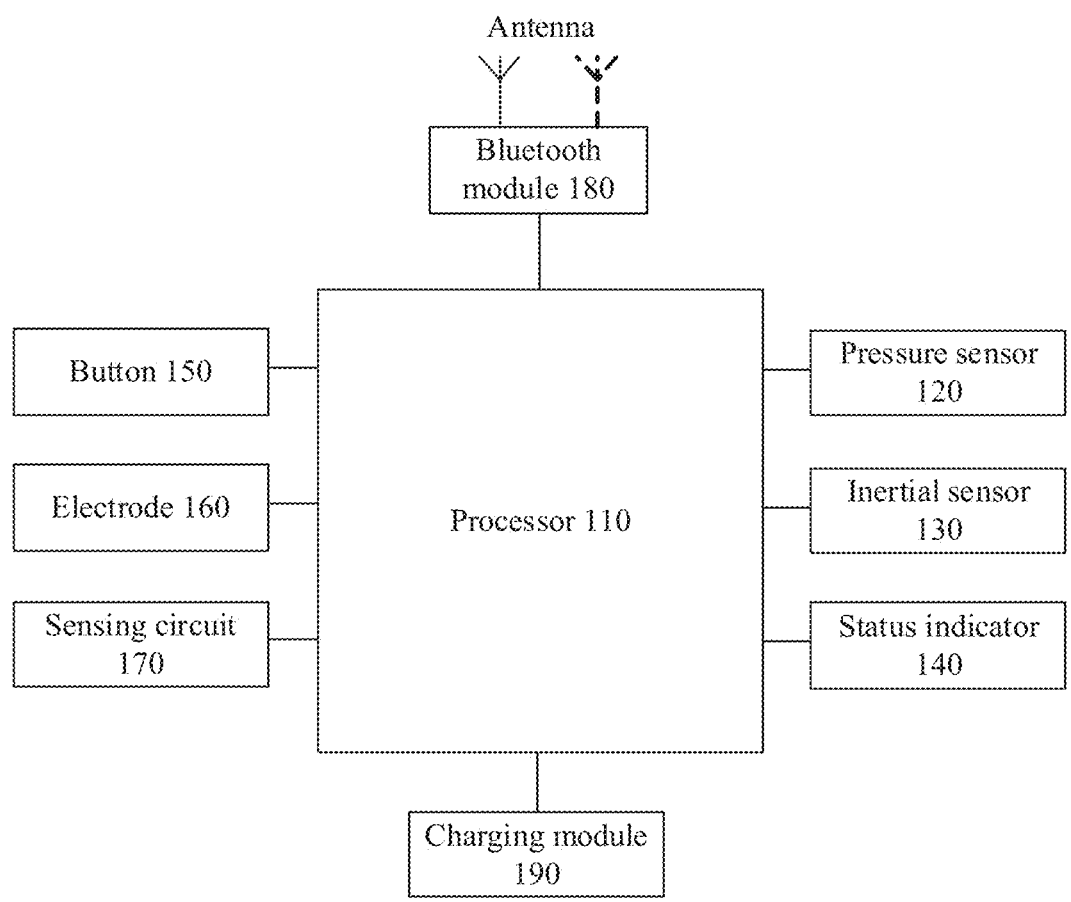
FIG. 5 is a schematic diagram of a module structure of a Bluetooth stylus according to an embodiment of this application.

FIG. 5 is a schematic diagram of a structure of a Bluetooth stylus 100 according to an embodiment of this application. The Bluetooth stylus may be used as the slave device in FIG. 1. With reference to FIG. 5, the Bluetooth stylus 100 may include a processor 110. The processor 110 may include storage and processing circuits configured to support an operation of the Bluetooth stylus 100. The storage and processing circuits may include a storage apparatus such as a non-volatile memory (for example, a flash memory or other electrically programmable read-only memory configured as a solid-state drive), a volatile memory (for example, a static or dynamic random access memory), and the like. The processing circuit in the processor 110 may be used to control an operation of the Bluetooth stylus 100. The processing circuit may be based on one or more microprocessors, microcontrollers, digital signal processors, baseband processors, power management units, audio chips, application-specific integrated circuits, or the like.

The Bluetooth stylus 100 may include one or more sensors. For example, the sensor may include a pressure sensor 120. The pressure sensor 120 may be disposed at a writing end 11 of the Bluetooth stylus 100 (as shown in FIG. 6B). Certainly, the pressure sensor 120 may further be disposed in a stylus rod 20 of the Bluetooth stylus 100.

The sensor may also include an inertial sensor 130. The inertial sensor 130 may include a tri-axis accelerometer and a tri-axis gyroscope, and/or other components configured to measure movement of the Bluetooth stylus 100. The sensor may also include an additional sensor such as a temperature sensor, an ambient light sensor, a light-based proximity sensor, a contact sensor, a magnetic sensor, a pressure sensor, and/or other sensors.

The Bluetooth stylus 100 may include a status indicator 140 such as a light emitting diode and a button 150. The status indicator 140 is configured to prompt a user with a status of the Bluetooth stylus 100. The button 150 may include a mechanical button and a non-mechanical button, and the button 150 may be configured to collect button press information from the user.

In this embodiment of this application, the Bluetooth stylus 100 may include one or more electrodes 160 (for details, refer to the descriptions about FIG. 6B), one electrode 160 may be located at the writing end of the Bluetooth stylus 100, and one electrode 160 may be located in a tip 10.

The Bluetooth stylus 100 may include a sensing circuit 170. The sensing circuit 170 may be configured to sense capacitive coupling between the electrode 160 and a drive line of a capacitive touch sensor panel that interacts with the Bluetooth stylus 100.

It may be understood that, according to actual requirements, the Bluetooth stylus 100 may include a microphone, a speaker, an audio generator, a vibrator, a camera, a data port, and other devices. The user may control, by providing commands through these devices, operations of the Bluetooth stylus 100 and the electronic device with which the Bluetooth stylus 100 interacts, and receive status information and other output.

The processor 110 may be configured to run software that is on the Bluetooth stylus 100 and that controls operations of the Bluetooth stylus 100. During operations of the Bluetooth stylus 100, the software run on the processor 110 may process sensor input, button input, and input from another device to monitor movement of the Bluetooth stylus 100 and another user input. The software run on the processor 110 may detect a user command and may communicate with the electronic device.

In order to support wireless communication between the Bluetooth stylus 100 and the electronic device, the Bluetooth stylus 100 may include a Bluetooth module 180. The Bluetooth module 180 may include a radio frequency transceiver, for example, a transceiver. The Bluetooth module 180 may alternatively include one or more antennas. The transceiver may transmit and/or receive a wireless signal by using the antenna. The wireless signal may be a Bluetooth signal, a wireless local area network signal, a remote signal such as a cellular telephone signal, a near field communication signal, or other wireless signals based on a type of the wireless module.

The Bluetooth stylus 100 may further include a charging module 190, and the charging module 190 may support charging of the Bluetooth stylus 100 and provide power for the Bluetooth stylus 100.

Figure 6A:
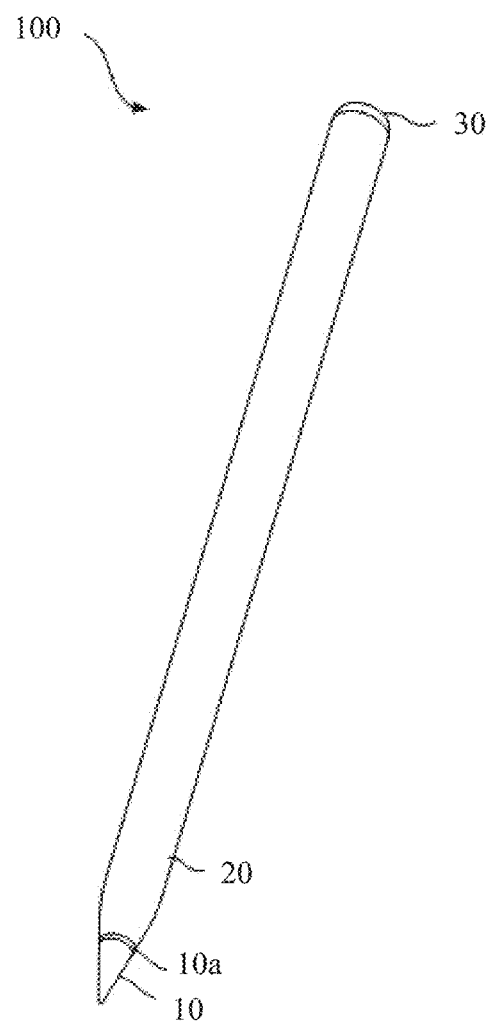
FIG. 6A and FIG. 6B each are a schematic diagram of a structure of a Bluetooth stylus according to an embodiment of this application.
Figure 6B:
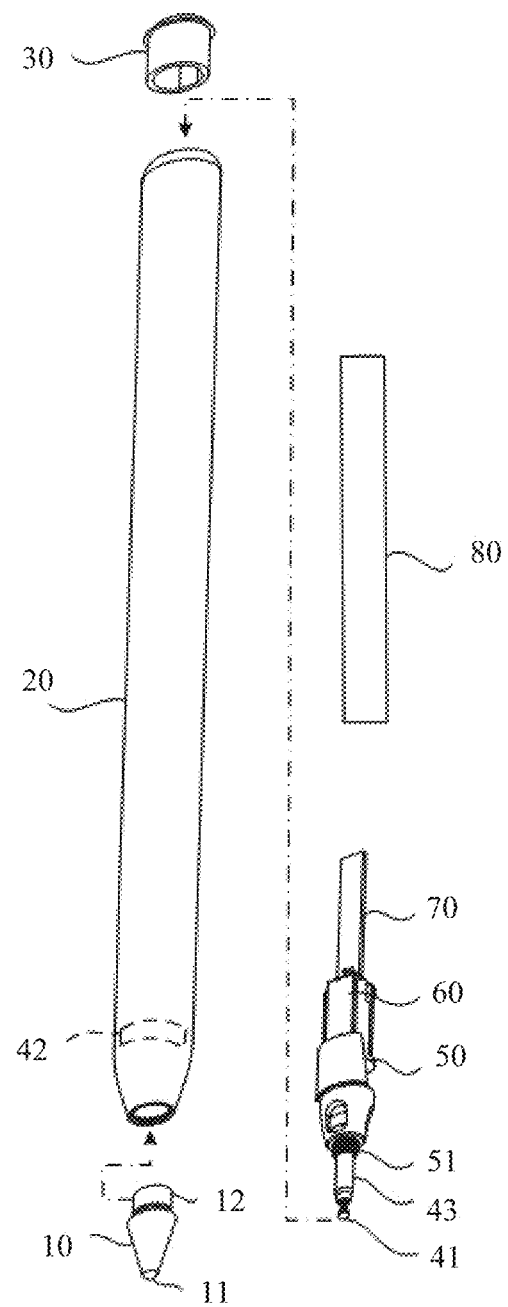

With reference to FIG. 6A and FIG. 6B, the Bluetooth stylus 100 may include a tip 10, a stylus rod 20, and a rear cover 30. The inside of the stylus rod 20 is in a hollow structure. The tip 10 and the rear cover 30 are respectively located at two ends of the stylus rod 20. The rear cover 30 and the stylus rod 20 may be connected through an inserting or snap-fitting manner. For a fitting relationship between the tip 10 and the stylus rod 20, refer to descriptions about FIG. 6B.

With reference to FIG. 6B, the Bluetooth stylus 100 further includes a spindle assembly 50. The spindle assembly 50 is located in the stylus rod 20, and the spindle assembly 50 is slidably disposed in the stylus rod 20. The spindle assembly 50 has an external screw thread 51, and the tip 10 includes a writing end 11 and a connecting end 12. The connecting end 12 of the tip 10 has an internal screw thread (not shown) fitting the external screw thread 51.

When the spindle assembly 50 is assembled into the stylus rod 20, the connecting end 12 of the tip 10 extends into the stylus rod 20 and is threadedly connected to the external screw thread 51 of the spindle assembly 50. In some other examples, the connecting end 12 of the tip 10 may also be connected to the spindle assembly 50 in a detachable manner, for example, snap-fitting. The connecting end 12 of the tip 10 is detachably connected to the spindle assembly 50, to implement replacement of the tip 10.

To detect pressure applied to the writing end 11 of the tip 10, as shown in FIG. 6A, there is a gap 10a between the tip 10 and the stylus rod 20. This can ensure that when the writing end 11 of the tip 10 is subjected to an external force, the tip 10 can move toward the stylus rod 20, and movement of the tip 10 drives the spindle assembly 50 to move in the stylus rod 20. To detect the external force, as shown in FIG. 6B, a pressure sensing assembly 60 is disposed on the spindle assembly 50. A part of the pressure sensing assembly 60 is fastened to a fastener in the stylus rod 20, and a part of the pressure sensing assembly 60 is fastened to the spindle assembly 50. In this way, when the spindle assembly 50 moves with the tip 10, because the part of the pressure sensing assembly 60 is fastened to the fastener in the stylus rod 20, movement of the spindle assembly 50 drives the pressure sensing assembly 60 to deform, and deformation of the pressure sensing assembly 60 is transmitted to a circuit board 70 (for example, the pressure sensing assembly 60 and the circuit board 70 can be electrically connected through a wire or a flexible circuit board). The circuit board 70 measures pressure of the writing end 11 of the tip 10 based on the deformation of the pressure sensing assembly 60, and therefore controls a line thickness of the writing end 11 based on the pressure of the writing end 11 of the tip 10.

It should be noted that detection on the pressure of the tip 10 includes but is not limited to the foregoing method. For example, a pressure sensor may be further disposed in the writing end 11 of the tip 10, and the pressure of the tip 10 is detected by the pressure sensor.

In this embodiment, as shown in FIG. 6B, the Bluetooth stylus 100 further includes a plurality of electrodes. The plurality of electrodes may be, for example, a first transmitting electrode 41, a ground electrode 43, and a second transmitting electrode 42. The first transmitting electrode 41, the ground electrode 43, and the second transmitting electrode 42 are electrically connected to the circuit board 70. The first transmitting electrode 41 may be located in the tip 10 and close to the writing end 11. The circuit board 70 may be configured as a control board for providing signals respectively to the first transmitting electrode 41 and the second transmitting electrode 42. The first transmitting electrode 41 is configured to transmit a first signal. When the first transmitting electrode 41 is close to a touch control screen of the electronic device, a coupling capacitance may be formed between the first transmitting electrode 41 and the touch control screen of the electronic device, so that the electronic device can receive the first signal. The second transmitting electrode 42 is configured to transmit a second signal, and the electronic device can determine an inclination angle of the Bluetooth stylus 100 based on the received second signal. In this embodiment of this application, the second transmitting electrode 42 may be located on an inner wall of the stylus rod 20. In an example, the second transmitting electrode 42 may also be located on the spindle assembly 50.

The ground electrode 43 may be located between the first transmitting electrode 41 and the second transmitting electrode 42, or the ground electrode 43 may be located at the outer periphery of the first transmitting electrode 41 and the second transmitting electrode 42, and the ground electrode 43 is used to reduce coupling between the first transmitting electrode 41 and the second transmitting electrode 42.

When the electronic device receives the first signal from the Bluetooth stylus 100, a capacitance value at a corresponding location on the touch screen changes. Accordingly, the electronic device may determine a location of the Bluetooth stylus 100 (or the tip of the Bluetooth stylus 100) on the touch screen based on the change in the capacitance value on the touch control screen. In addition, the electronic device may obtain the inclination angle of the Bluetooth stylus 100 through a double-tip projection method in an inclination angle detection algorithm. Because locations of the first transmitting electrode 41 and the second transmitting electrode 42 in the Bluetooth stylus 100 are different, capacitance values at the two locations on the touch control screen change when the electronic device receives the first signal and the second signal from the Bluetooth stylus 100. The electronic device may obtain the inclination angle of the Bluetooth stylus 100 based on a distance between the first transmitting electrode 41 and the second transmitting electrode 42 and a distance between the two locations at which the capacitance values on the touch control screen change. For more detailed descriptions of obtaining the inclination angle of the Bluetooth stylus 100, refer to related descriptions of the double-tip projection method in the conventional technology.

In this embodiment of this application, as shown in FIG. 6B, the Bluetooth stylus 100 further includes a battery assembly 80, where the battery assembly 80 is configured to provide power to the circuit board 70.

It will be apparent to those skilled in the art that some of the specific details presented above with respect to the electronic device 200, the Bluetooth keyboard 300, and the Bluetooth stylus 100 may not be required to practice specific described implementations or their equivalents. Therefore, it should be understood that the above description is not intended to be exhaustive or to limit the disclosure not to the accurate form described herein. Conversely, it will be apparent to those of ordinary skill in the art that many modifications and variations are possible according to the above teachings.

Figure 7A:
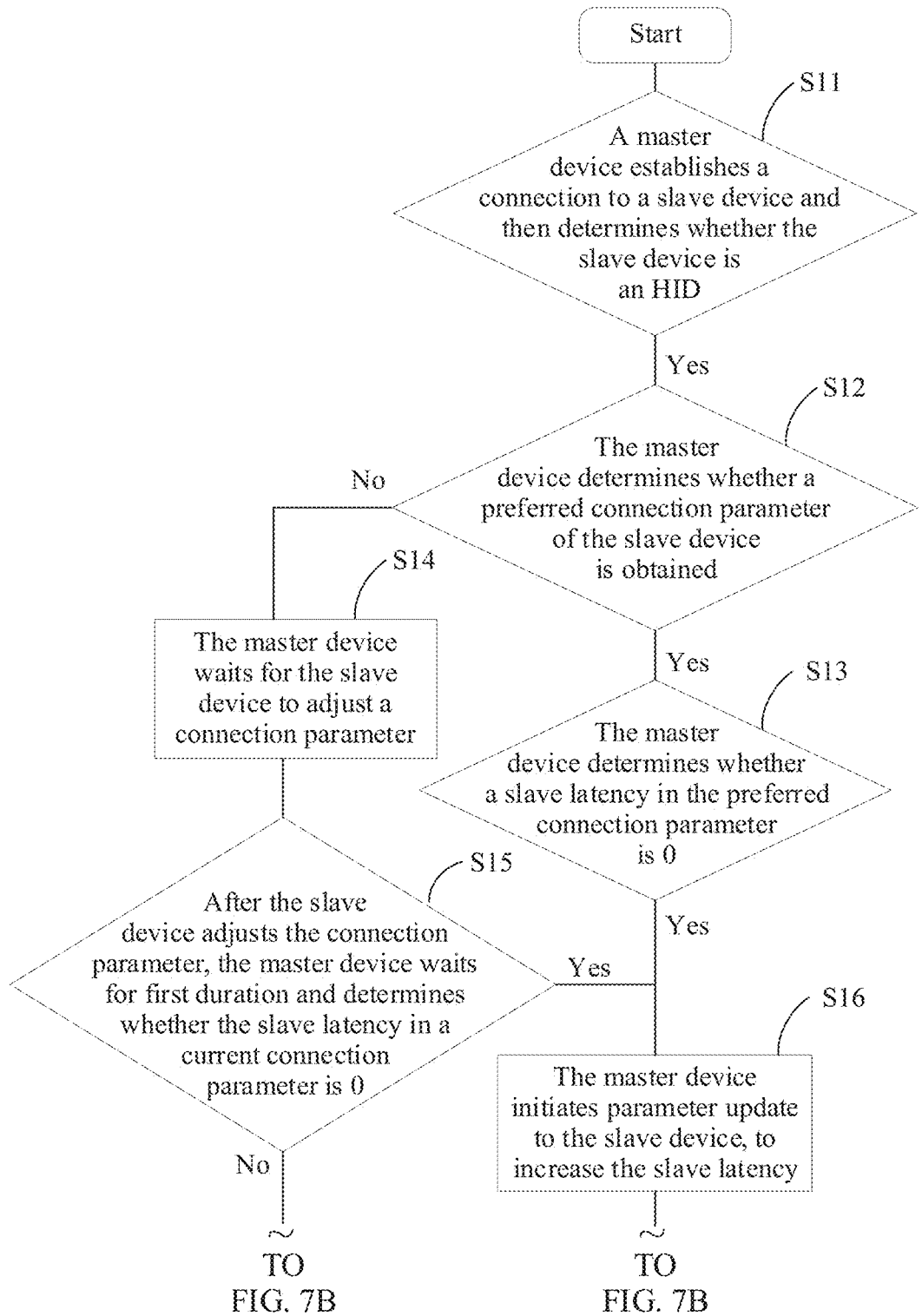
FIG. 7A and FIG. 7B are flowcharts of a method for reducing device power consumption according to an embodiment of this application.
Figure 7B:
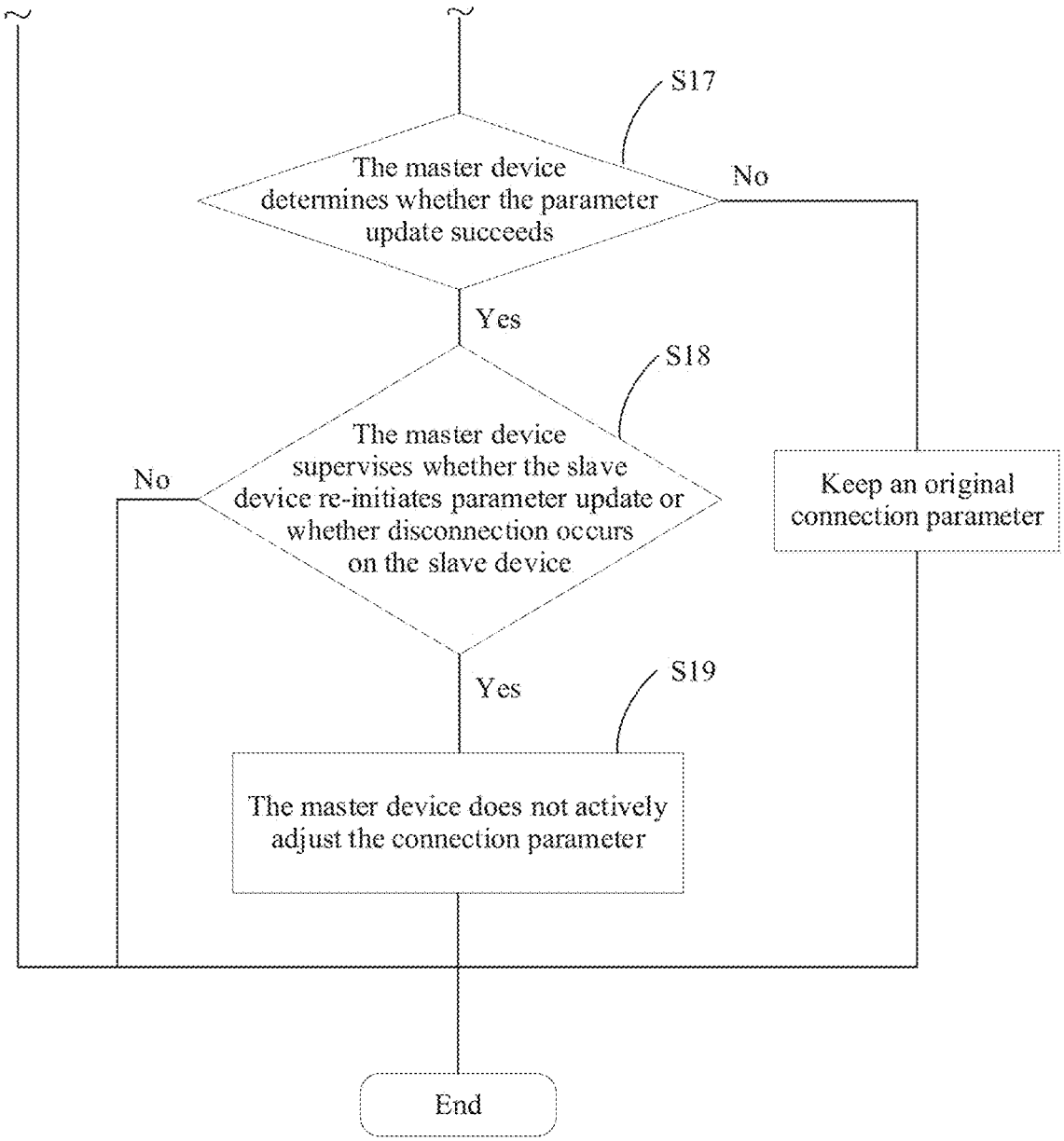

FIG. 7A and FIG. 7B are flowcharts of a method for reducing device power consumption according to an embodiment of this application. For a terminal system that includes a master device and a slave device, the method for reducing device power consumption performed in the terminal system may include the following steps.

Step S11: The master device establishes a connection to the slave device and then determines whether the slave device is an HID.

Generally, during a connection process between the master device and the slave device, the slave device may send a broadcast message peripherally to indicate existence of the slave device. Generally, the broadcast message of the slave device may include information that can be used to identify a device type of the slave device. Therefore, the master device may determine whether the slave device is the HID based on the information carried in the broadcast message received from the slave device.

Taking the slave device that employs a BLE connection as an example, the slave device may include advertisement type (AD type) information in the broadcast message of the slave device. The advertisement type information may include, for example, one or more of a device name, a preferred connection parameter, a device identifier (for example, a service universally unique identifier (UUID)), a device address, a device role, manufacturer data, and other information. In this way, the master device may determine whether the slave device is the HID based on the information in the advertisement type information, for example, to determine whether the slave device is the HID based on a device identifier of the slave device.

It may be understood that, when the master device is being connected to the slave device or after the master device is connected to the slave device, the master device may determine whether the slave device is the HID through any valuable information obtained by the master device from the slave device. How the master device determines whether the slave device is the HID is not specifically limited in this embodiment of this application.

Step S12: If the slave device is the HID, the master device determines whether the preferred connection parameter of the slave device is obtained.

Taking the slave device that employs the BLE connection as an example, generally, if the preferred connection parameter is set in advance for the slave device, the slave device may configure the preferred connection parameter in the advertisement type information and send the preferred connection parameter through the broadcast message. In this way, after receiving the broadcast message, the master device may read the preferred connection parameter of the slave device from the broadcast message. In addition, the slave device may also add an attribute containing the preferred connection parameter, so that the master device may obtain the preferred connection parameter of the slave device by reading the attribute. A manner in which the master device obtains the preferred connection parameter of the slave device is not specifically limited in this embodiment of this application.

The following specifically describes meaning and a value of each attribute in the preferred connection parameter involved in this embodiment of this application.

A connection interval refers to an interaction interval between the master device and the slave device, to be specific, a time interval from the start of a connection event to the start of a next connection event, generally in a unit of milliseconds. Generally, a value range of the connection interval is 7.5 ms-4000 ms, with a step of 1.25 ms. To be specific, a value of the connection interval is usually an integer multiple of 1.25 ms. It may be understood that, if the value of the connection interval is small, it means that a time interval from the start of the connection event to the start of the next connection event is short, connection events occur frequently, and power consumption of the master device and the slave device is large. If the value of the connection interval is large, it means that a time interval from the start of the connection event to the start of the next connection event is long, connection events do not occur frequently, and the power consumption of the master device and the slave device is small.

A slave latency refers to a quantity of connection events the slave device skips before responding to a data packet sent by the master device when the slave device has no data to send. Generally, a value range of the slave latency is 0-499, corresponding to 0-499 connection events. For example, a slave latency of 0 indicates that the slave device responds to a data packet sent by the master device in each connection event. A slave latency of 10 indicates that the slave device skips 10 connection events before responding to a data packet sent by the master device. It may be understood that, if the slave latency is small, it means that the slave device frequently responds to data packets of the master device, and the power consumption of the slave device is large. If the slave latency is large, it means that the slave device does not frequently respond to data packets of the master device, and the power consumption of the master device and the slave device is small.

In this embodiment of this application, if the master device obtains the preferred connection parameter of the slave device, step S13 may be performed. If the master device does not obtain the preferred connection parameter of the slave device, step S14 may be performed.

Step S13: The master device determines whether the slave latency in the preferred connection parameter is 0.

In a specific implementation, the master device may read the slave latency from the preferred connection parameter to obtain a value of the slave latency. If the slave latency is 0, the master device may perform step S16. If the slave latency is not 0, the master device may not perform subsequent steps.

In another implementation, the master device may further determine whether the slave latency in the preferred connection parameter is less than a preset threshold, where the preset threshold may be an integer greater than or equal to 0. If the slave latency is less than the preset threshold, the master device may perform step S16. If the slave latency is greater than or equal to the preset threshold, the master device may not perform the subsequent steps.

For example, the master device may set the threshold of the slave latency to 10. In this case, if the slave latency in the preferred connection parameter is less than 10, for example, 5, the master device performs step S16. If the slave latency in the preferred connection parameter is greater than or equal to 10, for example, 20, the master device does not perform the subsequent steps.

Step S14: The master device waits for the slave device to adjust a connection parameter.

Generally, if the preferred connection parameter is not set in advance for the slave device, the master device cannot obtain the preferred connection parameter. In this case, the master device and the slave device can use a default connection parameter to run, waiting for the slave device to adjust the connection parameter. The slave device for which the preferred connection parameter is not set may send a parameter update request to the master device after the slave device is connected to the master device. The parameter update request may include a new connection parameter. After receiving the parameter update request from the slave device, the master device may use the new connection parameter to continue communication with the slave device. If the master device does not receive the parameter update request from the slave device, the master device and the slave device may keep running through the original connection parameter.

Step S15: After the slave device adjusts the connection parameter, the master device waits for first duration and determines whether the slave latency in a current connection parameter is 0.

In this embodiment of this application, after the slave device adjusts the connection parameter, the master device does not immediately determine a value of the slave latency in the current connection parameter, but waits for the first duration, so that the master device and the slave device run for a period of time based on a connection parameter adjusted by the slave device. Then, the value of the slave latency in the current connection parameter is determined. If the slave latency is 0, step S16 is performed. If the slave latency is not 0, the master device may not perform subsequent steps. In this way, this prevents the master device from frequently adjusting the connection parameter between the master device and the slave device, thereby improving connection stability.

In this embodiment of this application, a value of the first duration may be flexibly set by a skilled person who performs this method. A value range of the first duration is preferably several seconds to several minutes, for example, 180 seconds, 3 minutes, 4 minutes, 5 minutes, and the like.

In an implementation, the master device may further determine whether the slave latency in the current connection parameter is less than a preset threshold, where the preset threshold may be an integer greater than or equal to 0. If the slave latency is less than the preset threshold, the master device may perform step S16. If the slave latency is greater than or equal to the preset threshold, the master device may not perform the subsequent steps.

For example, the master device may set the threshold of the slave latency to 10. In this case, if the slave latency in the current connection parameter is less than 10, for example, 8, the master device performs step S16. If the slave latency in the current connection parameter is greater than or equal to 10, for example, 30, the master device does not perform the subsequent steps.

Step S16: The master device initiates parameter update to the slave device, to increase the slave latency.

In an implementation, the master device may initiate the parameter update to the slave device, and adjust the slave latency to a target value, where the target value may be a positive integer greater than 0, for example, 20, 30, or 40. This is not limited in this embodiment of this application.

The master device may adjust the slave latency to the target value and keep another attribute value in the current connection parameter unchanged, to obtain a new connection parameter. Then, the master device may perform a connection parameter update control process and uses the new connection parameter to initiate parameter update to the slave device.

Figure 8:
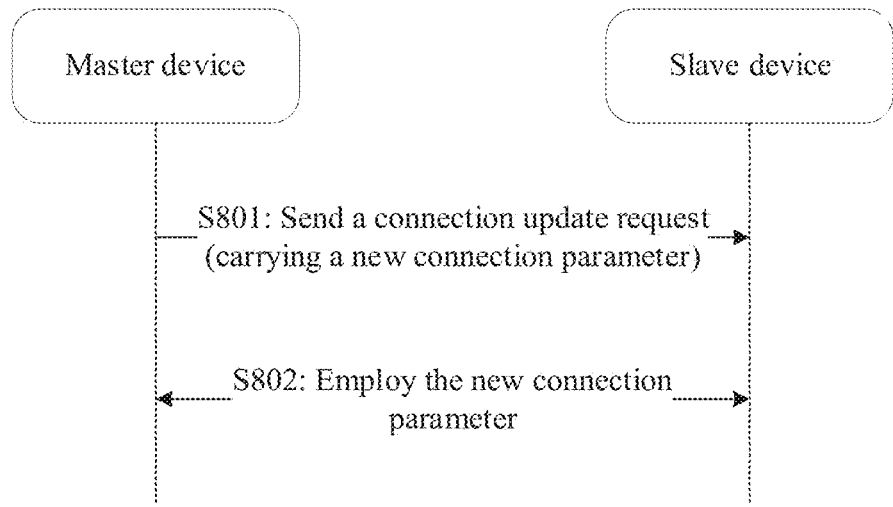
FIG. 8 is a flowchart of a connection parameter update control process performed by a master device according to an embodiment of this application.

As shown in FIG. 8, a connection parameter update control process performed by a master device may include the following steps.

Step S801: The master device sends a connection update request to a slave device.

The connection update request may carry a new connection parameter. The connection update request may further include an instant parameter (instant). The instant parameter is used to indicate a time at which connection parameter update starts.

Step S802: After receiving the connection update request, if the parameter update is accepted, the slave device may apply the new connection parameter to communicate with the master device from the time at which the connection parameter update starts. If the parameter update is not accepted, the new connection parameter is not applied. In this case, the slave device may be disconnected from the master device.

Step S17: The master device determines whether the parameter update succeeds.

In a specific implementation, after the master device applies the new connection parameter at an instant time, the master device may determine whether the slave device also employs the new connection parameter to communicate with the master device, for example, to determine whether the slave device responds to a data packet of the master device based on a new slave latency. That the slave device also employs the new connection parameter indicates that the parameter update succeeds. That the slave device rejects the parameter update, or the slave device is disconnected from the master device indicates that the parameter update fails.

In this embodiment of this application, if the parameter update of the master device succeeds, the master device may perform step S18. If the parameter update of the master device fails, the master device and the slave device may keep communicating with each other through the original connection parameter.

Step S18: The master device supervises, within second duration that starts from a time at which the parameter update succeeds, whether the slave device re-initiates parameter update or whether disconnection occurs on the slave device.

Due to differences in software and hardware design capabilities of different manufacturers, and differences in hardware levels of different types or models of slave devices, some slave devices may not be compatible with the new connection parameter and thus cannot communicate with the master device, resulting in some stability issues. In this case, the slave device may be disconnected from the master device, or the slave device may further re-initiate parameter update to the master device, so that the slave device and the master device may communicate with each other based on a desired connection parameter of the slave device.

Therefore, in this embodiment of this application, the master device supervises, within the second duration that starts from the time at which the parameter update succeeds, whether the slave device re-initiates the parameter update or whether the disconnection occurs on the slave device. That the slave device does not re-initiate the parameter update, or the disconnection does not occur indicates that the slave device may perform stable communication with the master device based on the new connection parameter. That the slave device re-initiates the parameter update, or the disconnection occurs indicates that the slave device may have some compatibility issues with the new connection parameter. In this case, the master device performs step S19.

In this embodiment of this application, a value of the second duration may be flexibly set by a skilled person who performs this method. Because the slave device re-initiates the parameter update, or the disconnection occurs usually occurs quickly the slave device has the compatibility issues with the new connection parameter, the value of the second duration may be relatively small. For example, a value range of the second duration may preferably be several seconds to tens of seconds, for example, 5 seconds, 10 seconds, 15 seconds, and the like, so that the master device quickly takes a measure when the master device finds that the slave device has the compatibility issues with the new connection parameter.

Figure 9:
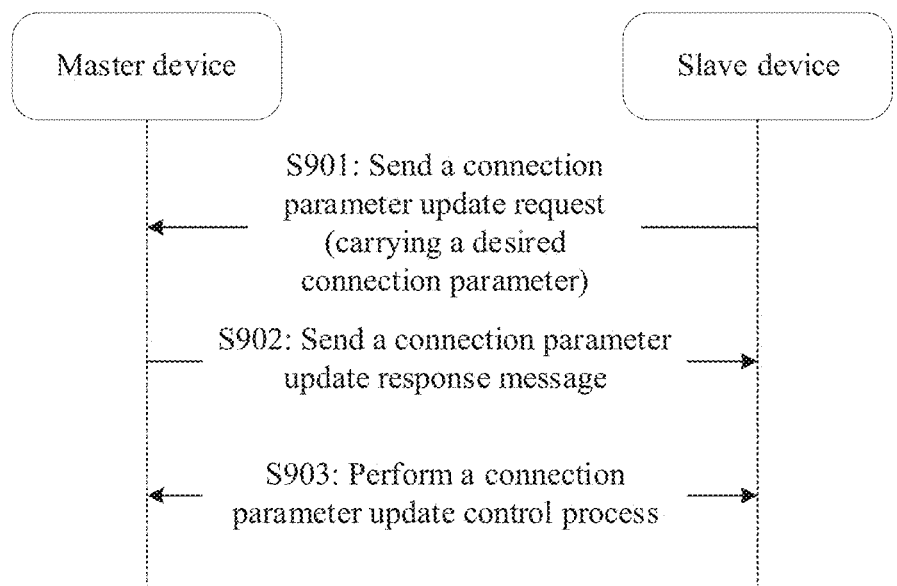
FIG. 9 is a flowchart of initiating parameter update by a slave device to a master device according to an embodiment of this application.

FIG. 9 is a flowchart of an example of initiating parameter update by a slave device to a master device. For a terminal system that includes the master device and the slave device, an parameter update process initiated by the slave device to the master device may include the following steps S901 to S903.

Step S901: The slave device sends a connection parameter update request to the master device.

The connection parameter update request may include a connection parameter that is desired by the slave device, for example, a connection interval, a slave latency, supervision timeout, and the like.

Step S902: The master device sends a connection parameter update response message to the slave device.

In a specific implementation, if the master device accepts the parameter update request of the slave device, the master device may carry a result code indicating "accepted" in the parameter update response message, and perform step S903. If the master device does not accept the parameter update request of the slave device, the master device may carry a result code indicating "rejected" in the parameter update response message. After receiving the connection parameter update response message that includes the result code indicating "rejected", the slave device may select to communicate with the master device through the original connection parameter or may select to be disconnected from the master device.

Step S903: The master device performs a connection parameter update control process based on the connection parameter that is desired by the slave device.

For implementation of the connection parameter update control process performed by the master device, refer to steps S801 and S802 specifically. Details are not described herein again.

Step S19: The master device does not actively adjust the connection parameter.

In a specific implementation, if the slave device re-initiates parameter update to the master device, the master device may employ the connection parameter that desired by the slave device to continue to communicate with the slave device, and then will not actively initiate the parameter update to the slave device. If disconnection occurs on the slave device, the master device likewise will not actively initiate the parameter update to the slave device, but passively adjust the connection parameter only when the slave device initiates the parameter update.

In an implementation, if the slave device re-initiates the parameter update to the master device, the connection parameter that is desired by the slave device may be recorded. In this way, when the master device subsequently establishes a connection to the slave device, the master device may initiate the parameter update to the slave device directly using the recorded connection parameter, to directly employ the connection parameter that is desired by the slave device to communicate with the slave device.

According to the foregoing method, when the slave latency of the slave device is 0, the master device actively initiates the parameter update to the slave device, so that the slave latency of the slave device is greater than 0. In this way, when the master device is not required to send data to the slave device, this method may decrease frequency at which the slave device responds to data packets of the master device, to reduce power consumption of the slave device.

Figure 10:
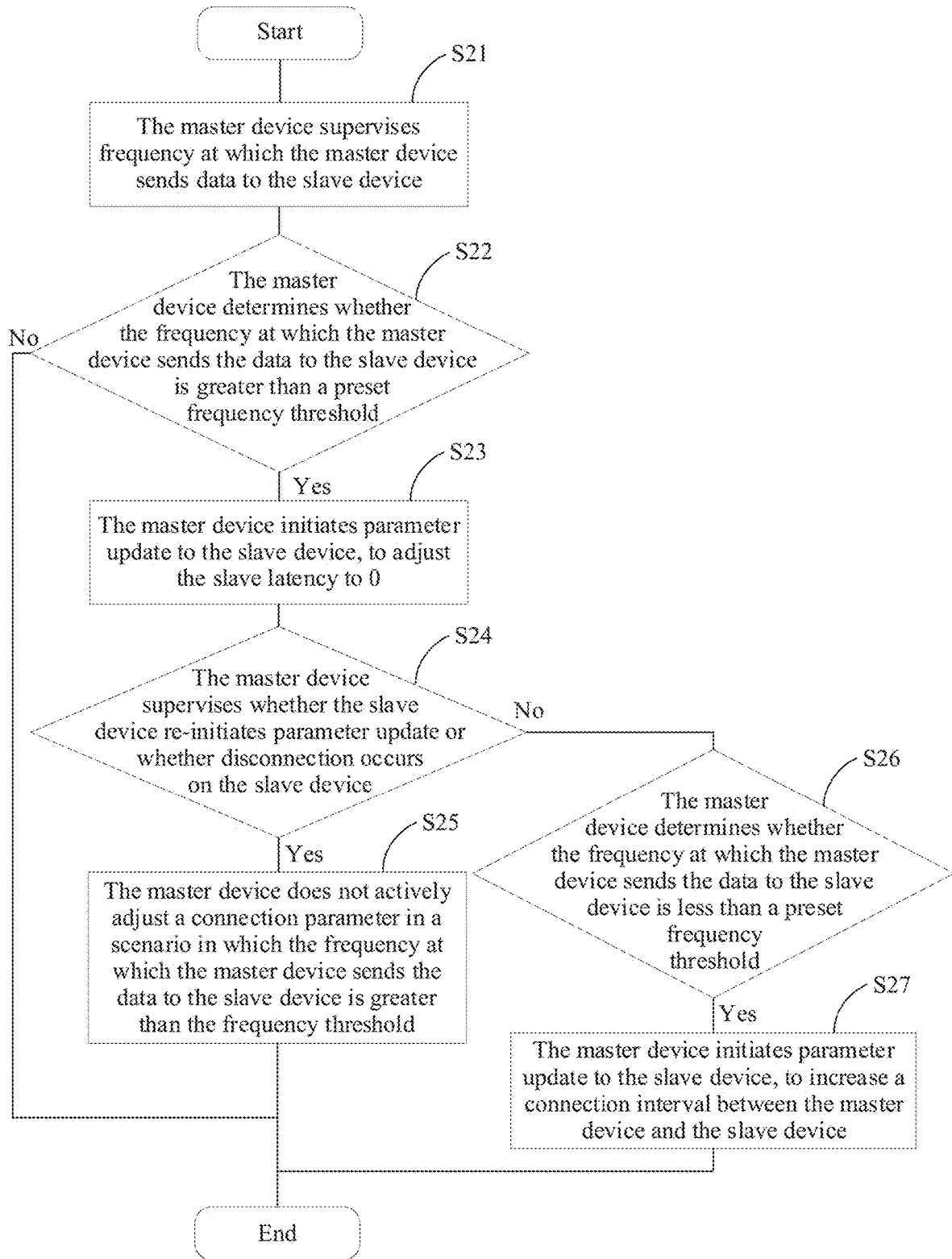
FIG. 10 is another flowchart of a method for reducing device power consumption according to an embodiment of this application.

FIG. 10 is another flowchart of a method for reducing device power consumption according to an embodiment of this application. For a terminal system that includes a master device and a slave device, the method for reducing device connection power consumption in this embodiment of this application, performed in the terminal system, may further include the following steps.

Step S21: The master device supervises frequency at which the master device sends data to the slave device.

In an implementation, the master device may collect statistics about a quantity of data packets sent to the slave device within fifth duration, and represent the frequency at which the master device sends the data to the slave device using the quantity. A larger quantity of data packets sent by the master device to the slave device within the fifth duration indicates higher frequency at which the master device sends the data to the slave device. A smaller quantity of data packets sent by the master device to the slave device within the fifth duration indicates lower frequency at which the master device sends the data to the slave device.

For example, when the master device and the slave device communicate through a BLE connection, the data packet may be an attribute protocol (ATT) data packet.

In this embodiment of this application, a value of the fifth duration may be flexibly set by a skilled person who performs this method. To enable the master device to adjust a connection parameter in a timely manner when frequency at which the master device receives data from and sends data to an external device increases, the fifth duration may preferably be several seconds to tens of seconds, for example, 2 seconds, 3 seconds, 10 seconds, and the like.

Step S22: The master device determines whether the frequency at which the master device sends the data to the slave device is greater than a preset frequency threshold.

In an implementation, when the master device uses a quantity of data packets sent by the master device to the slave device to represent the frequency at which the master device sends the data, the frequency threshold may be the quantity of data packets. That the quantity of data packets sent by the master device to the slave device within the fifth duration is greater than the frequency threshold indicates that the master currently sends relatively large bits of data to the slave device. In this case, the master device may perform step S23.

In this embodiment of this application, the frequency threshold may be flexibly set by a skilled person who performs this method. A value of the frequency threshold may be related to the value of the fifth duration. Larger fifth duration indicates a larger frequency threshold. Smaller fifth duration indicates a smaller frequency threshold. For example, when the fifth duration is 1 second, the frequency threshold may be 10. When the fifth duration is 3 seconds, the frequency threshold may be 30. When the fifth duration is 5 seconds, the frequency threshold may be 50.

Figure 11:
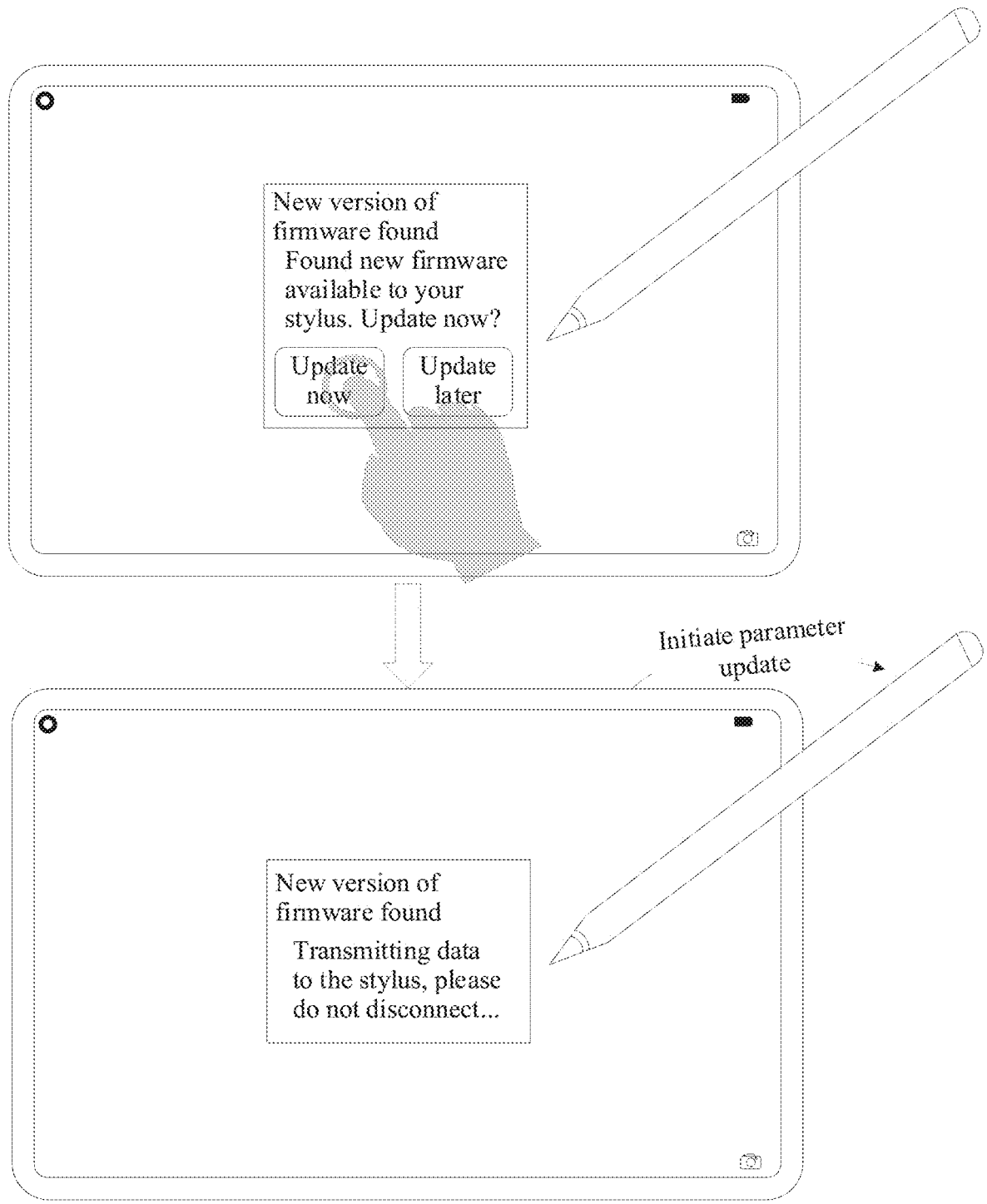
FIG. 11 is a diagram of a scenario in which frequency at which a master device sends data to a slave device is greater than a frequency threshold according to an embodiment of this application.

FIG. 11 is a diagram of a scenario in which frequency at which a master device sends data to a slave device is greater than a frequency threshold. For example, when the master device and the slave device are in a connected state, the master device may check, on a server, whether there is firmware update for the slave device. If there is the firmware update for the slave device, the master device may generate a dialog window on a display of the master device, to confirm whether a user wants to update firmware of the slave device. If the user chooses to update the firmware, the master device downloads the firmware from the server and transmits the firmware to the slave device. In the case, the master device sends a large quantity of data packets to the slave device, causing the frequency at which the master device sends the data to the slave device to be greater than the frequency threshold.

Step S23: The master device initiates parameter update to the slave device, to adjust slave latency to 0.

Generally, after the master device sends a data packet in a connection event to the slave device, if a response to the data packet is received from the slave device, it may be considered that the data packet sent by the master device is received by the slave device. If no response to the data packet is received from the slave device is not received, it may be considered that the data packet sent by the master device is not received by the slave device. In this case, the master may re-send the data packet, until a response to the data packet by is received from the slave device. Accordingly, when the frequency at which the master device sends the data to the slave device is greater than the frequency threshold, the master device initiates the parameter update to the slave device, to adjust the slave latency to 0. In this way, the slave device responds to a data packet sent by the master device in each connection event. This increases a data transmission speed when the master device transmits large bits of data to the slave device.

Step S24: The master device supervises, within third duration that starts from a time at which the parameter update succeeds, whether the slave device re-initiates parameter update or whether disconnection occurs on the slave device.

In an implementation, after the master device initiates the parameter update to the slave device, the master device may determine whether the parameter update succeeds based on whether the slave device employs a new connection parameter, or based on whether the slave device is disconnected from the master device, or the like. If the parameter update succeeds, the master device supervises, within the third duration that starts from the time at which the parameter update succeeds, whether the slave device re-initiates the parameter update or whether the disconnection occurs on the slave device. That the slave device does not re-initiate the parameter update, or the disconnection does not occur indicates that the slave device may perform stable communication with the master device based on the new connection parameter. That the slave device re-initiates the parameter update, or the disconnection occurs indicates that the slave device may have some compatibility issues with the new connection parameter. In this case, the master device performs step S25. If the slave device does not re-initiate the parameter update, or the disconnection does not occur, the master device may perform step S26.

In this embodiment of this application, a value of the third duration may be flexibly set by a skilled person who performs this method. Considering that the slave device has the compatibility issues with the new connection parameter, that the slave device re-initiates the parameter update, or the disconnection occurs usually occurs quickly. Therefore, the value of the third duration may be relatively small. For example, a value range of the third duration may preferably be several seconds to tens of seconds, for example, 5 seconds, 10 seconds, 15 seconds, and the like, so that the master device quickly takes a measure when the master device finds that the slave device has the compatibility issues with the new connection parameter.

Step S25: The master device does not actively adjust a connection parameter in a scenario in which the frequency at which the master device sends the data to the slave device is greater than the frequency threshold.

In an implementation, if the slave device re-initiates the parameter update to the master device, or the disconnection occurs on the slave device, the master device does not actively adjust the connection parameter, but passively adjusts the connection parameter only when the slave device initiates a parameter update request.

Step S26: The master device determines whether the frequency at which the master device sends the data to the slave device is less than the preset frequency threshold.

In an implementation, when the master device determines whether a quantity of data packets that the master device sends, within preset sixth duration, to the slave device is less than a frequency threshold, the frequency threshold may be the same as or may be different from the frequency threshold in step S22. This is not specifically limited herein. That the frequency at which the master device sends the data to the slave device is less than the preset frequency threshold indicates that the master device has sent large bits of data to the slave device. In this case, the master device may perform step S27.

Step S27: The master device initiates parameter update to the slave device, to increase a connection interval between the master device and the slave device.

In an implementation, the master device may adjust the connection interval to any value greater than 0, and preferably adjust to the value before step S23 is performed. For example, if the connection interval is 20 before the master device performs step S23, the master device adjusts the connection interval from 0 to 20 in step S27.

According to the foregoing method, when data that is sent by the master device to the slave device increases, the master device actively initiates the parameter update to the slave device, to adjust the slave latency of the slave device to 0. In this way, the slave device responds to a data packet sent by the master device in each connection event. This increases a data transmission speed when the master device transmits large bits of data to the slave device.

Figure 12:
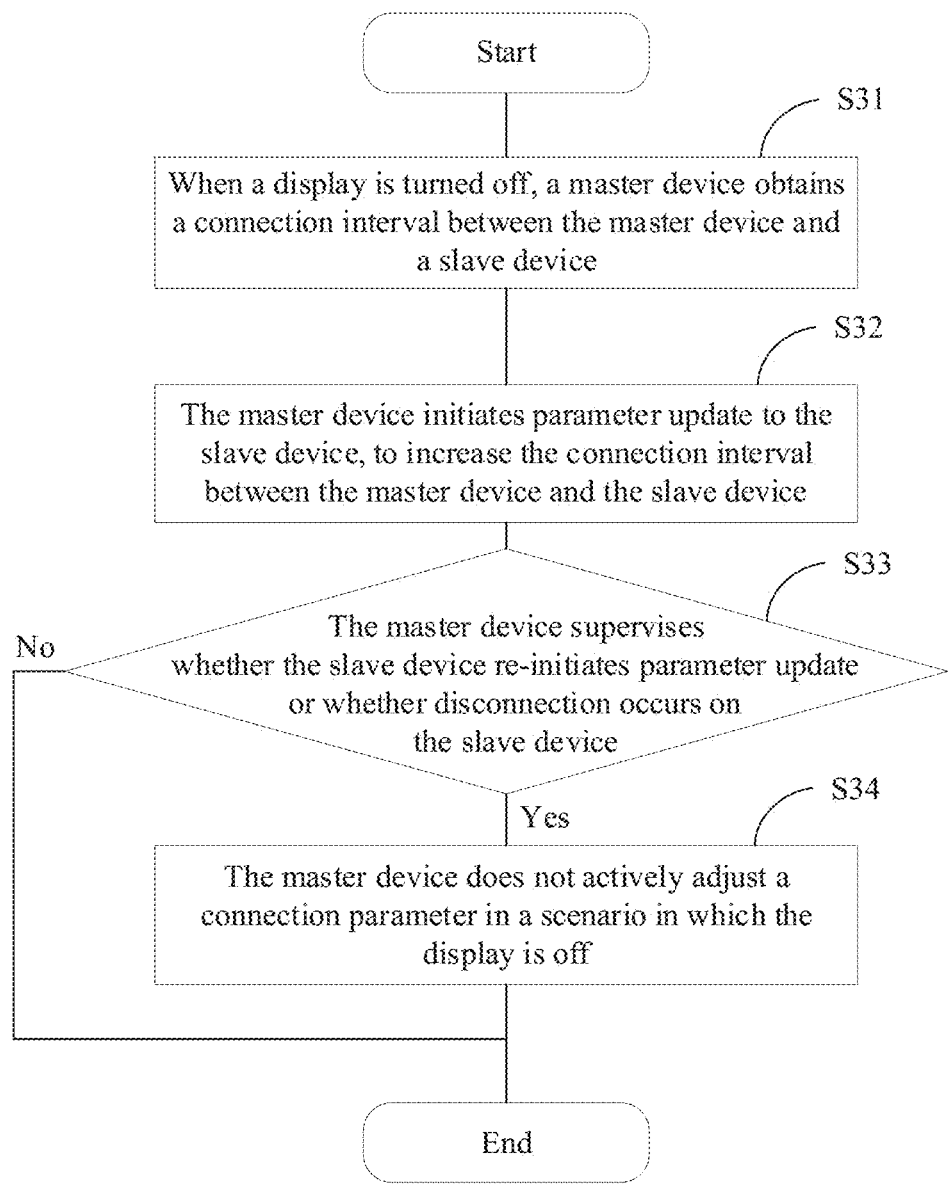
FIG. 12 is still another flowchart of a method for reducing device power consumption according to an embodiment of this application.
Figure 13:
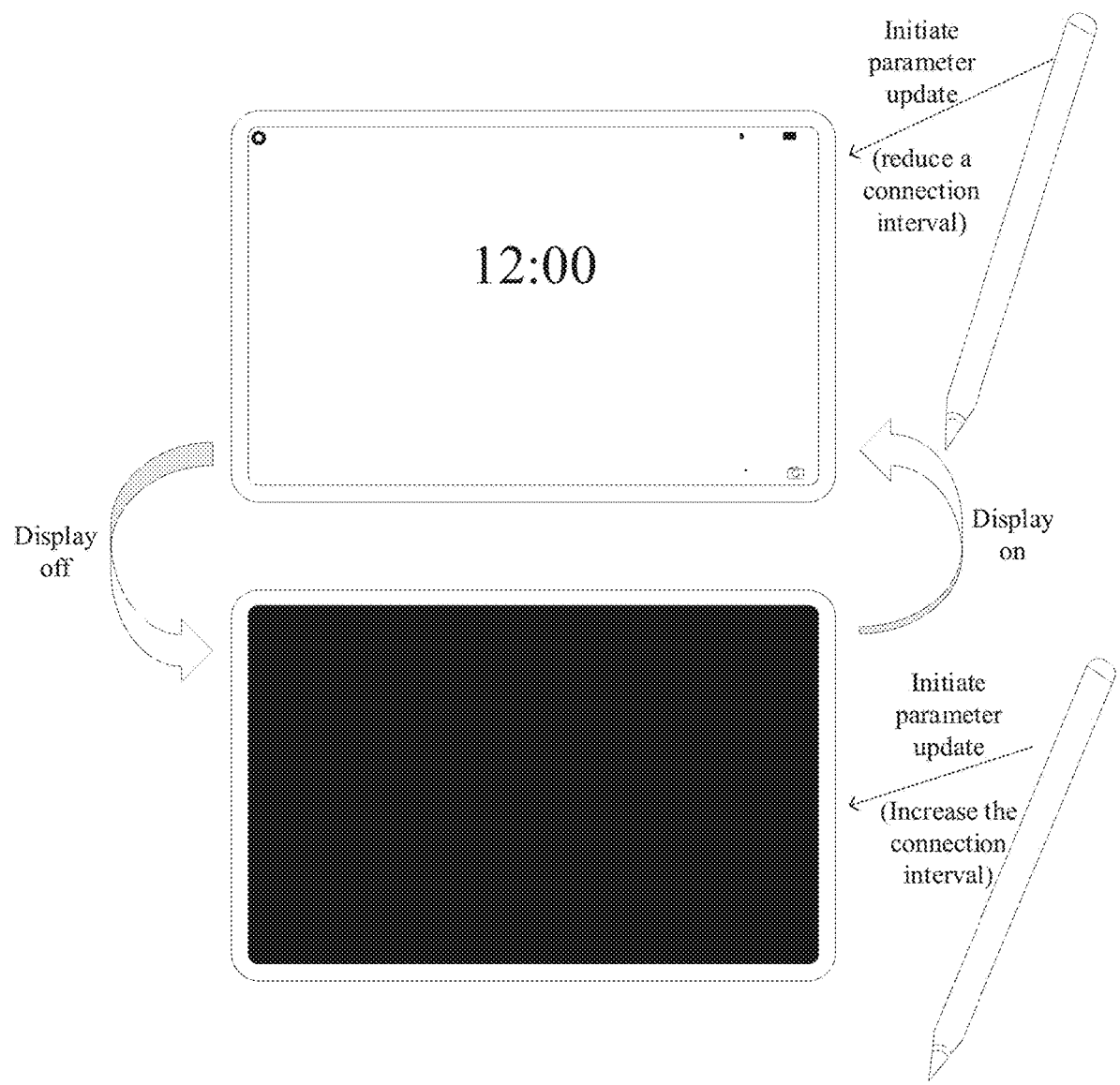
FIG. 13 is a diagram of an application scenario of a method for reducing device power consumption according to an embodiment of this application.

FIG. 12 is still another flowchart of a method for reducing device power consumption according to an embodiment of this application. FIG. 13 is a diagram of an application scenario of a method for reducing device power consumption according to an embodiment of this application. As shown in FIG. 12 and FIG. 13, for a terminal system that includes a master device and a slave device, the method performed in the terminal system may further include the following steps.

Step S31: When a display is turned off, the master device obtains a connection interval between the master device and the slave device.

For example, as shown in FIG. 13, when the display of the master device is in a screen-on state, if a user does not perform any operation on the master device within a period of time, or the user presses a screen lock button on the master device, the display of the master device changes from the screen-on state to a screen-off state. When the display is turned off, the master device may read an attribute value of the connection interval from a current connection parameter.

Step S32: The master device initiates parameter update to the slave device, to increase the connection interval between the master device and the slave device.

In an implementation, the master device may increase the connection interval by one or more times, and preferably by 3-5 times, as a new connection interval, and keep another attribute value in the connection parameter unchanged, to obtain a new connection parameter. Then, the master device initiates the parameter update to the slave device using the new connection parameter, to increase the connection interval between the master device and the slave device.

Step S33: The master device supervises, within fourth duration that starts from a time at which the parameter update succeeds, whether the slave device re-initiates parameter update or whether disconnection occurs on the slave device.

In an implementation, after the master device initiates the parameter update to the slave device, the master device may determine whether the parameter update succeeds based on whether the slave device employs the new connection parameter, or based on whether the slave device is disconnected from the master device, or the like. If the parameter update succeeds, the master device supervises, within the fourth duration that starts from the time at which the parameter update succeeds, whether the slave device re-initiates the parameter update or whether the disconnection occurs on the slave device. That the slave device does not re-initiate the parameter update, or the disconnection does not occur indicates that the slave device may stably perform communication with the master device based on the new connection parameter. That the slave device re-initiates the parameter update, or the disconnection occurs indicates that the slave device may have some compatibility issues with the new connection parameter. In this case, the master device may perform step S34.

In this embodiment of this application, a value of the fourth duration may be flexibly set by a skilled person who performs this method. A value range of the fourth duration may preferably be several seconds to tens of seconds, for example, 5 seconds, 10 seconds, 15 seconds, and the like, so that the master device quickly takes a measure when the master device finds that the slave device has the compatibility issues with the new connection parameter.

Step S34: The master device does not actively adjust the connection parameter in a scenario in which the display is turned off.

In an implementation, if the slave device re-initiates the parameter update to the master device, or the disconnection occurs on the slave device, the master device does not actively adjust the connection parameter in the scenario in which the display is turned off, but passively adjusts the connection parameter only when the slave device initiates a parameter update request.

According to the foregoing method, when the display is turned off, the master device actively initiates the parameter update to the slave device to increase the connection interval between the master device and the slave device, to reduce frequency of connection events, thereby reducing power consumption of the master device and the slave device.

Figure 14:
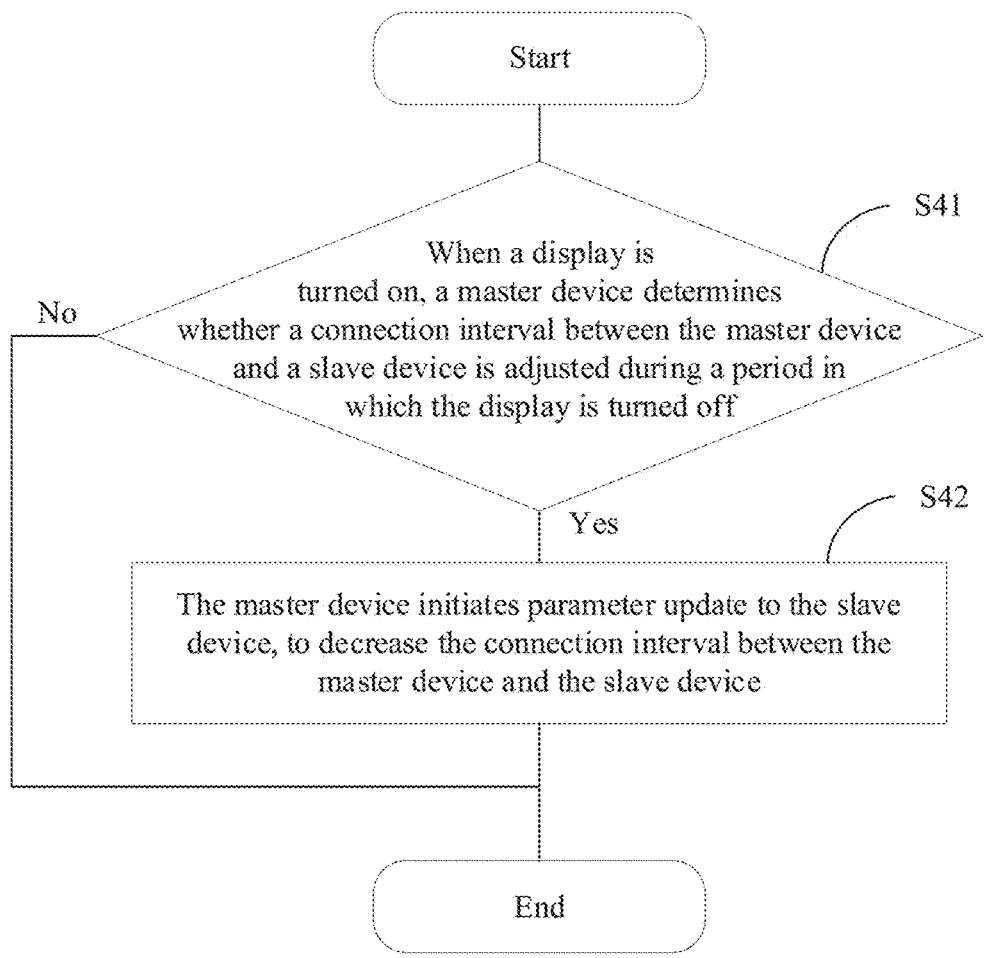
FIG. 14 is yet another flowchart of a method for reducing device power consumption according to an embodiment of this application.

FIG. 14 is yet another flowchart of a method for reducing device power consumption according to an embodiment of this application. As shown in FIG. 13 and FIG. 14, for the terminal system that includes the master device and the slave device, when the method for reducing device connection power consumption in embodiments of this application is performed in the terminal system, the method may further include the following steps.

Step S41: When a display is turned on, the master device determines whether a connection interval between the master device and the slave device is adjusted during a period in which the display is turned off.

For example, as shown in FIG. 13, when the display of the master device is in a screen-off state, if a user raises the master device, or the user presses a power button of the master device, the display of the master device changes from the screen-off state to a screen-on state. In this case, the master device determines whether the connection interval between the master device and the slave device is adjusted during the period in which the display is turned off. If the connection interval is adjusted, the master device performs step S42.

Step S42: The master device initiates parameter update to the slave device, to decrease the connection interval between the master device and the slave device.

In an implementation, the master device may decrease a current connection interval by one or more times, and preferably restore the current connection interval to a value before an increase, as a new connection interval, and keep another attribute value in the connection parameter unchanged, to obtain a new connection parameter. Then, the master device initiates the parameter update to the slave device using the new connection parameter, to decrease the connection interval between the master device and the slave device.

According to the foregoing method, when the display is turned on, the master device actively initiates the parameter update to the slave device to decrease the connection interval between the master device and the slave device, to increase frequency of connection events. In this way, when the master device sends a data packet to the slave device, the slave device responds to the data packet in a timely manner.

Figure 15:
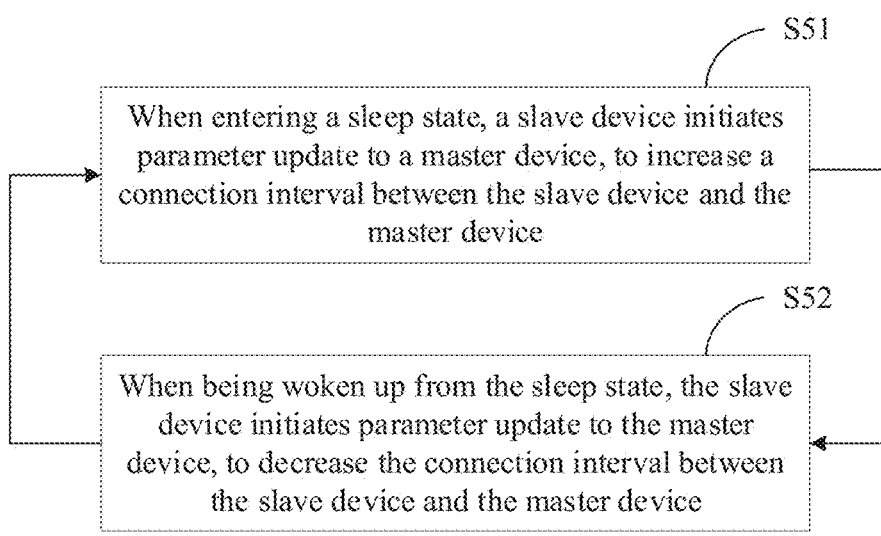
FIG. 15 is still yet another flowchart of a method for reducing device power consumption according to an embodiment of this application.

FIG. 15 is still yet another flowchart of a method for reducing device power consumption according to an embodiment of this application. For a terminal system that includes a master device and a slave device, when the method is performed in the terminal system, the method may include the following steps.

Step S51: When entering a sleep state, the slave device initiates parameter update to the master device, to increase a connection interval between the slave device and the master device.

For example, when the slave device and the master device are in a connected state, if a user does not use the slave device within a period of time, the slave device may enter the sleep state. For example, when the user has not used a stylus to perform a writing operation on a portable android device within a period of time, the stylus enters the sleep state. For another example, when the user has not used a Bluetooth headset to play music within a period of time, the Bluetooth headset enters the sleep state. For another example, when the user has not used a Bluetooth keyboard to perform an input operation within a period of time, the Bluetooth keyboard enters the sleep state.

When entering the sleep state, the slave device may increase the connection interval by one or more times, and preferably increase by 3-5 times, as a new connection interval, and keep another attribute value in the connection parameter unchanged, to obtain a new connection parameter. Then, the slave device initiates the parameter update to the master device using the new connection parameter, to increase the connection interval between the slave device and the master device.

Step S52: When being woken up from the sleep state, the slave device initiates parameter update to the master device, to decrease the connection interval between the slave device and the master device.

For example, during a sleep period of the slave device, if the user operates the slave device, the slave device is woken up from the sleep state. For example, during a sleep period of the stylus, if the stylus is used to perform the writing operation on the portable android device, the stylus is woken up. For another example, during a sleep period of the Bluetooth headset, if the user uses the Bluetooth headset to play music, the Bluetooth headset is woken up. For another example, during a sleep period of the Bluetooth keyboard, if the user uses the Bluetooth keyboard to perform the input operation, the Bluetooth keyboard is woken up.

When being woken up from the sleep state, the slave device may decrease the connection interval by one or more times, and preferably restore the connection interval to a value before an increase, as a new connection interval, and keep another attribute value in the connection parameter unchanged, to obtain a new connection parameter. Then, the slave device initiates the parameter update to the master device using the new connection parameter, to decrease the connection interval between the slave device and the master device.

According to the foregoing method, when entering the sleep state, the slave device actively increases the connection interval between the slave device and the master device, to reduce power consumption. When being woken up from the sleep state, the slave device actively decreases the connection interval between the slave device and the master device, to improve real-time performance of data transmission.

In the foregoing embodiment provided by this application, all solutions of the method for reducing device power consumption provided in this application is described from a perspective of the master device, the slave device, and an interaction between the master device and the slave device. It may be understood that to implement the foregoing functions, the master device or the slave device includes corresponding hardware structures and/or software modules for performing the functions. Persons skilled in the art should be easily aware that, in combination with the units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 16:
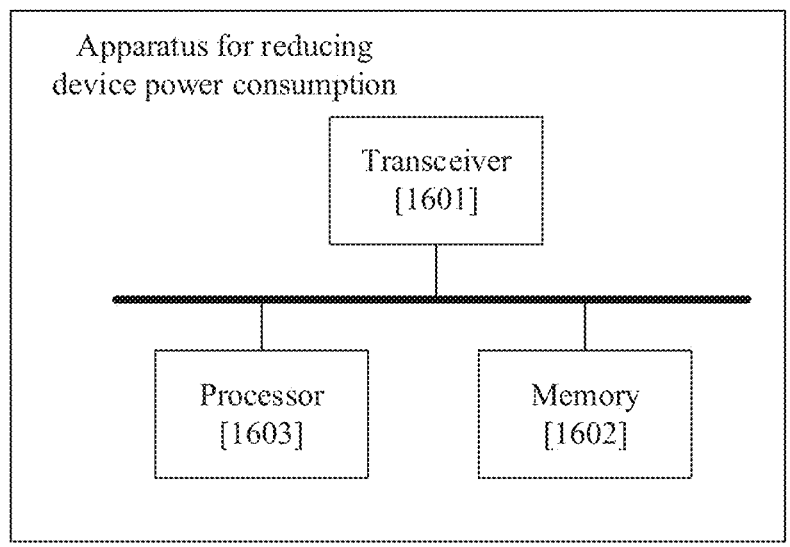
FIG. 16 is a schematic diagram of a structure of an apparatus for reducing device power consumption according to an embodiment of this application.

FIG. 16 is a schematic diagram of a structure of an apparatus for reducing device power consumption according to an embodiment of this application. As shown in FIG. 16, the apparatus may include a transceiver 1601, a memory 1602, and a processor 1603. The processor 1603 may include one or more processing units. For example, the processor 1603 may include an application processor, a modem processor, a controller, a digital signal processor, a baseband processor, and/or a neural-network processor, and the like. Different processing units may be separate devices or may be integrated into one or more processors. The memory 1602 is coupled to the processor 1603, and is configured to store various software programs and/or a plurality of instructions. In some embodiments, the memory 1602 may include a volatile memory and/or a non-volatile memory. The transceiver 1601 may include, for example, a radio frequency circuit, a mobile communication module, a wireless communication module, a Bluetooth communication module, and the like, and is configured to implement a wireless communication function.

In some embodiments, the apparatus may be configured to implement functions of a master device.

In an implementation, when the software programs and/or the plurality of instructions in the memory 1602 are run by the processor 1603, the master device is enabled to perform the following steps of the method: establishing a wireless connection to a slave device, and then determining whether the slave device is a human interface device; if the slave device is the human interface device, determining whether a preferred connection parameter of the slave device is obtained, where the preferred connection parameter includes a slave latency, and the slave latency includes a quantity of connection events the slave device skips before responding to a data packet sent by the master device when the slave device has no data to send to the master device; if the preferred connection parameter is obtained, determining whether the slave latency is 0 or is less than a first threshold; and if the slave latency is 0 or is less than the first threshold, initiating parameter update to the slave device, to increase the slave latency. In this way, when the master device is not required to send data to the slave device, the slave device may decrease frequency of responding to the data packet of the master device, to reduce power consumption of the slave device.

In an implementation, when the software programs and/or the plurality of instructions in the memory 1602 are run by the processor 1603, the master device is further enabled to perform the following steps of the method: if the preferred connection parameter is not obtained, waiting for the slave device to adjust a connection parameter; after the slave device adjusts the connection parameter, waiting for first duration; determining whether the slave latency in a current connection parameter is 0 or is less than a first threshold; and if the slave latency is 0 or is less than the first threshold, initiating parameter update to the slave device, to increase the slave latency. In this way, when the master device is not required to send data to the slave device, the slave device may decrease frequency of responding to the data packet of the master device, to reduce power consumption of the slave device.

In an implementation, when the software programs and/or the plurality of instructions in the memory 1602 are run by the processor 1603, the master device is further enabled to perform the following steps of the method: determining whether the parameter update succeeds; supervising, within second duration that starts from a time at which the parameter update succeeds, whether the slave device re-initiates parameter update or whether disconnection occurs; and if the slave device re-initiates the parameter update, or the disconnection occurs, skipping actively adjusting the connection parameter. In this way, that the slave device re-initiates the parameter update, or the disconnection occurs indicates that the slave device may have some compatibility issues with the new connection parameter. Therefore, the master device does not actively adjust the connection parameter of the slave device, and connection stability is improved.

In an implementation, when the software programs and/or the plurality of instructions in the memory 1602 are run by the processor 1603, the master device is further enabled to perform the following steps of the method: establishing the wireless connection to the slave device, and then determining whether frequency at which the master device sends data to the slave device is greater than a second threshold; and if the frequency at which the master device sends the data to the slave device is greater than the second threshold, initiating parameter update to the slave device, to adjust the slave latency to 0. In this way, when the data sent by the master device to the slave device increases, the master device actively initiates the parameter update to the slave device to adjust the slave latency of the slave device to 0, so that the slave device responds to a data packet sent by the master device in each connection event. This increases a data transmission speed.

In an implementation, when the software programs and/or the plurality of instructions in the memory 1602 are run by the processor 1603, the master device is further enabled to perform the following steps of the method: supervising, within third duration that starts from a time at which the parameter update succeeds, whether the slave device re-initiates parameter update or whether disconnection occurs; and if the slave device re-initiates the parameter update or the disconnection occurs, skipping actively adjusting a connection parameter in a scenario in which the frequency at which the master device sends the data to a slave device is greater than the second threshold. In this way, that the slave device re-initiates the parameter update, or the disconnection occurs indicates that the slave device may have some compatibility issues with the new connection parameter. Therefore, in the scenario in which the frequency at which the master device sends the data to the slave device is greater than the second threshold, the master device does not actively adjust the connection parameter of the slave device, and connection stability is improved.

In an implementation, when the software programs and/or the plurality of instructions in the memory 1602 are run by the processor 1603, the master device is further enabled to perform the following steps of the method: if the slave device does not re-initiate the parameter update or the disconnection does not occur, determining whether the frequency at which the master device sends the data to the slave device is less than the second threshold; and if the frequency at which the master device sends the data to the slave device is less than the second threshold, initiating parameter update to the slave device, to increase a connection interval between the master device and the slave device, where the connection interval includes an interaction interval between the master device and the slave device. In this way, when the data sent by the master device to the slave device decreases, the master device actively initiates the parameter update to the slave device to increase the slave latency, thereby reducing the power consumption of the slave device.

In an implementation, when the software programs and/or the plurality of instructions in the memory 1602 are run by the processor 1603, the master device is further enabled to perform the following steps of the method: when a display is turned off, initiating parameter update to the slave device, to increase a connection interval between the master device and the slave device, where the connection interval includes an interaction interval between the master device and the slave device; supervising, within fourth duration that starts from a time at which the parameter update succeeds, whether the slave device re-initiates parameter update or whether disconnection occurs; and if the slave device re-initiates the parameter update or the disconnection occurs, skipping actively adjusting a connection parameter in a scenario in which the display is turned off. In this way, when the display is turned off, the master device actively initiates the parameter update to the slave device to increase the connection interval between the master device and the slave device, to reduce frequency of connection events, thereby reducing the power consumption of the master device and the slave device.

In an implementation, when the software programs and/or the plurality of instructions in the memory 1602 are run by the processor 1603, the master device is further enabled to perform the following steps of the method: when the display is turned on, determining whether the connection interval between the master device and the slave device is adjusted during a period in which the display is turned off; and if the connection interval between the master device and the slave device is adjusted, initiating parameter update to the slave device, to decrease the connection interval between the master device and the slave device. In this way, when the display is turned on, the master device actively initiates the parameter update to the slave device to decrease the connection interval between the master device and the slave device, to increase the frequency of connection events. Therefore, when the master device sends a data packet to the slave device, the slave device can respond to the data packet in a timely manner.

In an implementation, when the software programs and/or the plurality of instructions in the memory 1602 are run by the processor 1603, the master device is enabled to perform the following steps of the method, to implement an increase in a slave latency by initiating parameter update to the slave device: initiating the parameter update to the slave device, and adjusting the slave latency to a preset target value, where the preset target value is a positive integer greater than 0.

In an implementation, when the software programs and/or the plurality of instructions in the memory 1602 are run by the processor 1603, the master device is enabled to perform the following steps of the method, to implement an increase in a connection interval between the master device and the slave device by initiating parameter update to the slave device: initiating the parameter update to the slave device, to increase the connection interval between master device and the slave device by one or more times.

In an implementation, when the software programs and/or the plurality of instructions in the memory 1602 are run by the processor 1603, the master device is enabled to perform the following steps of the method, to implement a decrease in a connection interval between the master device and the slave device by initiating parameter update to the slave device: initiating the parameter update to the slave device, to decrease the connection interval between the master device and the slave device by one or more times.

In some other embodiments, the apparatus may be configured to implement a function of a slave device. For example, when the software programs and/or the plurality of instructions in the memory 1602 are run by the processor 1603, the slave device is enabled to perform the following steps of the method: when the slave device enters a sleep state, initiating parameter update to the master device, to increase a connection interval between the slave device and the master device, where the connection interval includes an interaction interval between the master device and the slave device; and when the slave device is woken up from the sleep state, initiating parameter update to the master device, to decrease the connection interval between the slave device and the master device. In this way, when entering the sleep state, the slave device actively increases the connection interval between the slave device and the master device, to reduce power consumption. When being woken up from the sleep state, the slave device actively decreases the connection interval between the slave device and the master device, to improve real-time performance of data transmission.

In the several embodiments provided in this application, it should be understood that the disclosed apparatus and method may be implemented in another manner. For example, the described apparatus embodiment is only an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware or a software functional unit.

When the integrated unit is implemented in the form of a software function unit and is sold or used as an independent product, the integrated unit may be stored in a readable storage medium. Based on such an understanding, the technical solutions in the embodiments of this application essentially, or the part contributing to the prior art, or all or a part of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, a compact disc, or the like.

The foregoing content is merely specific implementations of this application, but is not intended to limit the protection scope of this application. Any variation or replacement within the technical scope disclosed in this application shall fall within the protection scope of this application. Therefore, the protection scope of this application shall be used as protection scope of the claims.

What is claimed is:

1. An electronic device, comprising:
   one or more processors; and
   a memory, wherein the memory is coupled to the one or more processors, wherein the memory is configured to store computer program code that comprises computer instructions, and wherein the one or more processors are configured to invoke the computer instructions to cause the electronic device to:
   establish, by the electronic device which is used as a master device, a wireless connection to a second electronic device which is used as a slave device;
   determine, by the electronic device, whether the second electronic device is a human interface device;
   based on the second electronic device being a human interface device, determine, by the electronic device, whether a preferred connection parameter of the second electronic device is obtained, wherein the preferred connection parameter comprises a slave latency, and the slave latency comprises a quantity of connection events the slave device skips before responding to a data packet sent by the master device when the slave device has no data to send to the master device;

based on the preferred connection parameter being obtained, determine, by the electronic device, whether the slave latency is 0 or is less than a first threshold; and based on the slave latency being 0 or being less than the first threshold, initiate, by the electronic device, parameter update to the second electronic device, to increase the slave latency.

2. The electronic device according to claim 1, wherein the one or more processors invoking the computer instructions further cause the electronic device to:

after the electronic device determines whether the preferred connection parameter of the second electronic device is obtained, based on the preferred connection parameter not being obtained, wait, by the electronic device, for the second electronic device to adjust a connection parameter;

wait, by the electronic device, for a first duration after the second electronic device adjusts the connection parameter;

determine, by the electronic device, whether the slave latency in a current connection parameter is 0 or is less than the first threshold; and based on the slave latency being 0 or being less than the first threshold, initiate, by the electronic device, parameter update to the second electronic device, to increase the slave latency.

3. The electronic device according to claim 1, wherein the one or more processors invoking the computer instructions further cause the electronic device to:

after the electronic device initiates the parameter update to the second electronic device, determine, by the electronic device, whether the parameter update succeeds;

based on the parameter update succeeding, supervise, by the electronic device, within a second duration that starts from a time at which the parameter update succeeds, whether the second electronic device re-initiates parameter update or whether disconnection occurs; and based on the second electronic device re-initiating the parameter update or the disconnection occurring, skip actively adjusting the connection parameter, by the electronic device.

4. The electronic device according to claim 1, wherein the one or more processors invoking the computer instructions further cause the electronic device to:

after the electronic device establishes the wireless connection to the second electronic device, determine, by the electronic device, whether frequency at which the electronic device sends data to the second electronic device is greater than a second threshold; and based on the frequency at which the electronic device sends the data to the second electronic device being greater than the second threshold, initiate, by the electronic device, parameter update to the second electronic device, to adjust the slave latency to 0.

5. The electronic device according to claim 4, wherein the one or more processors invoking the computer instructions further cause the electronic device to:

after the electronic device initiates the parameter update to the second electronic device to adjust the slave latency to 0, supervise, by the electronic device, within a third duration that starts from a time at which the parameter update succeeds, whether the second electronic device re-initiates parameter update or whether disconnection occurs; and based on the second electronic device re-initiating the parameter update or the disconnection occurring, skip actively adjusting a connection parameter, by the electronic device, in a scenario in which the frequency at which the electronic device sends the data to the second electronic device is greater than the second threshold.

6. The electronic device according to claim 5, wherein the one or more processors invoking the computer instructions further cause the electronic device to:

after the electronic device supervises whether the second electronic device re-initiates parameter update or whether disconnection occurs, based on the second electronic device not re-initiating the parameter update or the disconnection not occurring, determine, by the electronic device, whether the frequency at which the electronic device sends the data to the second electronic device is less than the second threshold; and based on the frequency at which the electronic device sends the data to the second electronic device being less than the second threshold, initiate, by the electronic device, parameter update to the second electronic device, to increase a connection interval between the electronic device and the second electronic device, wherein the connection interval comprises an interaction interval between the master device and the slave device.

7. The electronic device according to claim 1, wherein the one or more processors invoking the computer instructions further cause the electronic device to:

initiate, by the electronic device when a display of the electronic device is turned off, parameter update to the second electronic device, to increase a connection interval between the electronic device and the second electronic device, wherein the connection interval comprises an interaction interval between the master device and the slave device;

supervise, by the electronic device, within a fourth duration that starts from a time at which the parameter update succeeds, whether the second electronic device re-initiates parameter update or whether disconnection occurs; and based on the second electronic device re-initiating the parameter update or the disconnection occurring, skip actively adjusting a connection parameter, by the electronic device, in a scenario in which the display is turned off.

8. The electronic device according to claim 7, wherein the one or more processors invoking the computer instructions further cause the electronic device to:

determine, by the electronic device when the display is turned on, whether the connection interval between the electronic device and the second electronic device is adjusted during a period in which the display is turned off; and based on the electronic device adjusting the connection interval between the electronic device and the second electronic device, initiate, by the electronic device, parameter update to the second electronic device, to decrease the connection interval between the electronic device and the second electronic device.

9. The electronic device according to claim 8, wherein the one or more processors invoking the computer instructions further cause the electronic device to:

initiate, by the electronic device, the parameter update to the second electronic device, to decrease the connection interval between the electronic device and the second electronic device by one or more times.

10. The electronic device according to claim 7, wherein the one or more processors invoking the computer instructions further cause the electronic device to:

initiate, by the electronic device, the parameter update to the second electronic device, to increase the connection interval between electronic device and the second electronic device by one or more times.

11. The electronic device according to claim 1, wherein the one or more processors invoking the computer instructions further cause the electronic device to:

initiate, by the electronic device, the parameter update to the second electronic device, and adjust, by the electronic device, the slave latency to a preset target value, wherein the preset target value is a positive integer greater than 0.

12. A method for reducing device power consumption, the method comprising:

establishing, by an electronic device which is used as a master device, a wireless connection to a second electronic device which is used as a slave device;

determining, by the electronic device, whether the second electronic device is a human interface device;

based on the second electronic device being a human interface device, determining, by the electronic device, whether a preferred connection parameter of the second electronic device is obtained, wherein the preferred connection parameter comprises a slave latency, and the slave latency comprises a quantity of connection events the slave device skips before responding to a data packet sent by the master device when the slave device has no data to send to the master device;

based on the preferred connection parameter being obtained, determining, by the electronic device, whether the slave latency is 0 or is less than a first threshold; and based on the slave latency being 0 or being less than the first threshold, initiating, by the electronic device, parameter update to the second electronic device, to increase the slave latency.

* * * * *